United States Patent
Nakano et al.

(10) Patent No.: US 9,481,192 B2
(45) Date of Patent: Nov. 1, 2016

(54) THERMAL TRANSFER RECORDING SHEET

(71) Applicant: CANON KABUSHIKI KAISHA, Tokyo (JP)

(72) Inventors: Masao Nakano, Kamakura (JP); Yuko Katsumoto, Yokohama (JP); Taichi Shintou, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,799

(22) Filed: Aug. 26, 2015

(65) Prior Publication Data

US 2015/0367665 A1 Dec. 24, 2015

Related U.S. Application Data

(63) Continuation of application No. PCT/JP2015/052278, filed on Jan. 28, 2015.

(30) Foreign Application Priority Data

Feb. 28, 2014 (JP) ................. 2014-038873

(51) Int. Cl.
*B41M 5/382* (2006.01)
*B41M 5/388* (2006.01)
*B41M 5/39* (2006.01)
*B41J 17/00* (2006.01)
*C09B 23/00* (2006.01)
*B41M 5/41* (2006.01)
*B41M 5/385* (2006.01)

(52) U.S. Cl.
CPC .......... *B41M 5/38228* (2013.01); *B41J 17/00* (2013.01); *B41M 5/388* (2013.01); *B41M 5/3852* (2013.01); *B41M 5/3854* (2013.01); *B41M 5/3858* (2013.01); *B41M 5/39* (2013.01); *C09B 23/00* (2013.01); *B41M 5/385* (2013.01); *B41M 5/3856* (2013.01); *B41M 5/41* (2013.01); *B41M 2205/02* (2013.01); *B41M 2205/30* (2013.01)

(58) Field of Classification Search
CPC B41M 5/385; B41M 5/3852; B41M 5/3854; B41M 3/3856; B41M 5/39; B41M 5/41
See application file for complete search history.

(56) References Cited

U.S. PATENT DOCUMENTS

| | | | | |
|---|---|---|---|---|
| 5,369,078 A | * | 11/1994 | Eguchi ................. | B41M 5/3858 428/913 |
| 2007/0213221 A1 | * | 9/2007 | Arai ...................... | B41M 5/385 503/227 |
| 2011/0129624 A1 | * | 6/2011 | Sanada .................... | B41M 5/39 428/32.75 |
| 2014/0162183 A1 | * | 6/2014 | Katsumoto ............. | C09B 57/00 430/108.21 |
| 2014/0170553 A1 | * | 6/2014 | Mori ...................... | G03G 9/122 430/108.23 |

FOREIGN PATENT DOCUMENTS

| | | |
|---|---|---|
| JP | 5-262062 A | 10/1993 |
| JP | 6-41459 A | 2/1994 |
| JP | 6-155929 A | 6/1994 |
| JP | 7-096675 A | 4/1995 |
| JP | 8-011450 A | 1/1996 |
| JP | 10-181225 A | 7/1998 |
| JP | 2000-511214 A | 8/2000 |
| JP | 2003-205686 A | 7/2003 |
| JP | 2009-113374 A | 5/2009 |
| JP | 2009-241554 A | 10/2009 |
| JP | 2013-166370 A | 8/2013 |
| WO | WO92/19684 A1 | 11/1992 |
| WO | 2014/034093 A1 | 3/2014 |
| WO | 2014/034094 A1 | 3/2014 |

* cited by examiner

*Primary Examiner* — Betelhem Shewareged
(74) *Attorney, Agent, or Firm* — Canon U.S.A., Inc. IP Division

(57) ABSTRACT

An object of the present invention is to provide a thermal transfer recording sheet that enables high-chroma images to be formed, has a high color-developability that enables a wide color gamut to be achieved, and enables high-quality black images to be formed using process black. The thermal transfer recording sheet includes a base material, and a yellow dye layer including a yellow dye, a magenta dye layer including a magenta dye, and a cyan dye layer including a cyan dye that are disposed on the base material. The magenta dye, yellow dye, and cyan dye each contain specific compounds.

7 Claims, No Drawings

THERMAL TRANSFER RECORDING SHEET

CROSS-REFERENCE TO RELATED APPLICATIONS

This application is a Continuation of International Patent Application No. PCT/JP2015/052278, filed Jan. 28, 2015, which claims the benefit of Japanese Patent Application No. 2014-038873, filed Feb. 28, 2014, both of which are hereby incorporated by reference herein in their entirety.

TECHNICAL FIELD

The present invention relates to a thermal transfer recording sheet.

BACKGROUND ART

With the widespread use of portable color-display devices, there has been a rapidly growing demand for printing in a simple manner photographs or documents that are captured or prepared using such devices in color. This may be realized by a color printing method such as electrophotography, an ink-jet method, or thermal transfer recording. In particular, thermal transfer recording is a suitable method for realizing printing in a simple manner regardless of circumstances, because it enables printing to be performed using a dry process and allows reduced printer size, which increases printer portability. In addition, dyes are used as colorants in thermal transfer recording. This enables the density of images to be controlled by changing the density and gradations of the colorants, which increases the vividness of the images and enables a high color-reproduction capability to be achieved.

Thermal transfer recording is an image-forming method in which a thermal transfer sheet constituted by a sheet-like base material and a colorant layer disposed on the base material, the colorant layer including thermally migratable coloring matter, is superimposed on an image-receiving sheet including a coloring-matter-receiving layer disposed on the surface thereof, and the coloring matter included in the thermal transfer sheet is transferred to the image-receiving sheet by heating the thermal transfer sheet in order to perform recording. In thermal transfer recording, colorants included in the transfer sheet or in an ink composition included in the transfer sheet are critical materials that affect the speed of transfer recording and the quality and preservation stability of the recorded images.

There have been reported studies (Japanese Patent Laid-Open No. 5-262056, Japanese Patent Laid-Open No. 7-096675, and Japanese Patent Laid-Open No. 8-011450) in which yellow dyes, magenta dyes, and cyan dyes are used as colorants in the above-described thermal transfer recording. Images are formed using a yellow ink sheet, a magenta ink sheet, and a cyan ink sheet, which are prepared using the yellow dyes, the magenta dyes, and the cyan dyes, respectively. Therefore, black can be reproduced by mixing the three colors together (process black). In order to produce high-quality process black, it is necessary to use a combination of colorants which achieves uniform absorption over the entire visible spectrum. However, the higher the image vividness and color-reproduction capability required, the higher the chroma of the dyes needs to be, with such dyes exhibiting a steep and narrow absorption spectrum. As a result, wavelength components that are not absorbed may remain when the colors are mixed together, which disadvantageously hinders high-quality black from being produced.

CITATION LIST

Patent Literature

PTL 1 Japanese Patent Laid-Open No. 5-262056
PTL 2 Japanese Patent Laid-Open No. 7-096675
PTL 3 Japanese Patent Laid-Open No. 8-011450
PTL 4 WO92/19684

An object of the present invention is to provide a thermal transfer recording sheet that enables high-chroma images to be formed, a wide color gamut to be achieved, and high-quality (small average spectral reflectance) black images to be formed using process black.

SUMMARY OF INVENTION

The above-described issues may be addressed by using a thermal transfer recording sheet including a base material and a colorant layer on the base material. The colorant layer includes a yellow dye layer comprising a yellow dye, a magenta dye layer comprising a magenta dye, and a cyan dye layer comprising a cyan dye. The magenta dye contains a compound represented by General Formula (1). The yellow dye contains a compound represented by General Formula (2). The cyan dye contains at least one compound selected from the group consisting of compounds represented by General Formulae (3) to (5).

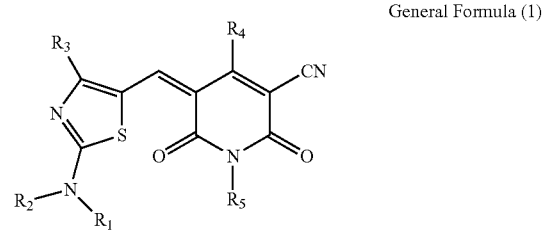

General Formula (1)

[In General Formula (1),
$R_1$ and $R_2$ each independently represent an alkyl group;
$R_3$ represents a hydrogen atom, an alkyl group, an aryl group having no substituents, or an aryl group having a substituent;
$R_4$ represents an alkyl group, an aryl group having no substituents, or an aryl group having a substituent; and
$R_5$ represents a hydrogen atom, an alkyl group, an aryl group having no substituents, an aryl group having a substituent, or $—N(—R_6)R_7$, $R_6$ and $R_7$ each independently represent a hydrogen atom, an alkyl group, or an acyl group, and $R_6$ and $R_7$ may be bonded to each other to form a ring.]

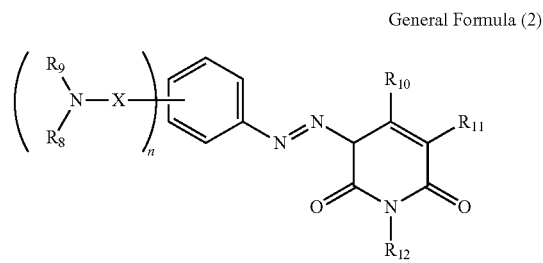

General Formula (2)

[In General Formula (2), $R_8$ represents an alkyl group;

$R_9$ represents a hydrogen atom or an alkyl group;

$R_{10}$ represents an alkyl group, an aryl group having no substituents, an aryl group having a substituent, or an amino group;

$R_{11}$ represents a hydrogen atom, a cyano group, a carbamoyl group, a carboxylic acid ester group, or a carboxylic acid amide group;

$R_{12}$ represents a hydrogen atom, an alkyl group, an aryl group having no substituents, an aryl group having a substituent, or —N(—$R_{13}$)$R_{14}$, $R_{13}$ and $R_{14}$ each independently represent a hydrogen atom, an alkyl group, or an acyl group, and $R_{13}$ and $R_{14}$ may be bonded to each other to form a ring;

X represents a carbonyl group or a sulfonyl group; and n is an integer of 1 to 3.]

General Formula (3)

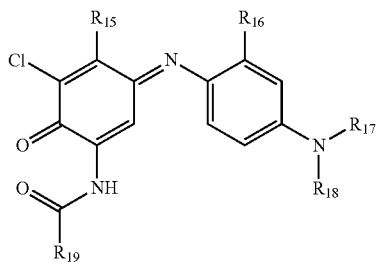

[In General Formula (3), $R_{25}$ to $R_{29}$ each independently represent an alkyl group, an aryl group having no substituents, or an aryl group having a substituent.]

General Formula (4)

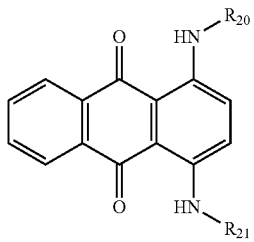

[In General Formula (4), $R_{20}$ and $R_{22}$ each independently represent an alkyl group or an aryl group.]

General Formula (5)

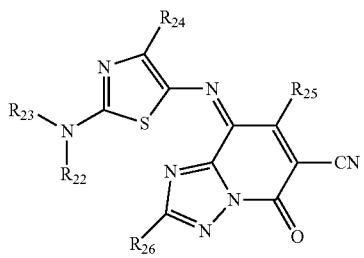

[In General Formula (5), $R_{22}$ to $R_{26}$ each independently represent an alkyl group or an aryl group.]

Further features of the present invention will become apparent from the following description of exemplary embodiments.

DESCRIPTION OF EMBODIMENTS

The present invention is further described in detail below.

The inventors of the present invention have conducted extensive studies in order to address the above-described issues and, as a result, found that a thermal transfer recording sheet including a base material and a colorant layer on the base material, the colorant layer including a yellow dye layer comprising a yellow dye, a magenta dye layer comprising a magenta dye, and a cyan dye layer comprising a cyan dye, the magenta dye being a compound represented by General Formula (1) below, the yellow dye being a compound represented by General Formula (2) below, and the cyan dye being at least one compound selected from the group consisting of compounds represented by General Formulae (3) to (5), enables high-chroma images to be formed, has a high color-developability that enables a wide color gamut to be achieved, and enables high-quality black image regions to be formed using process black. Thus, the present invention was made.

Magenta Dye

The magenta dye represented by General Formula (1) is described below.

General Formula (1)

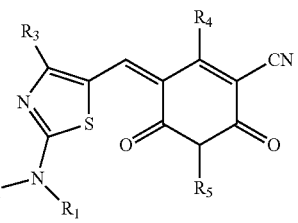

[In General Formula (1), $R_1$ and $R_2$ each independently represent an alkyl group;

$R_3$ represents a hydrogen atom, an alkyl group, an aryl group having no substituents, or an aryl group having a substituent;

$R_4$ represents an alkyl group, an aryl group having no substituents, or an aryl group having a substituent; and $R_5$ represents a hydrogen atom, an alkyl group, an aryl group, or —N(—$R_6$)$R_7$, $R_6$ and $R_7$ each independently represent a hydrogen atom, an alkyl group, or an acyl group, and $R_6$ and $R_7$ may be bonded to each other to form a ring.]

Examples of the alkyl groups represented by $R_1$ and $R_2$ in General Formula (1) include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, branched alkyl groups such as a 2-ethylhexyl group are preferably used in order to achieve a high chroma, a wide-color-gamut reproduction capability, and high-quality process black.

When $R_3$ in General Formula (1) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, a tert-butyl group is preferably used in order to achieve a high chroma, a wide-color-gamut reproduction capability, and high-quality process black.

When $R_3$ in General Formula (1) represents an aryl group, an example of the aryl group is, but not particularly limited to, a phenyl group. Examples of the substituent of the aryl group having a substituent include a methyl group, an ethyl group, and a methoxy group. Specific examples of the aryl group having a substituent include a 2-methylphenyl group, a 3-methylphenyl group, a 4-methylphenyl group, a 2,6-dimethylphenyl group, a 2,6-diethylphenyl group, a 2,6-dimethoxyphenyl group, a 2,4,6-trimethylphenyl group, a 2,4,6-triethylphenyl group, and a 3-methoxyphenyl group.

$R_3$ is more preferably a phenyl group or a tert-butyl group. $R_3$ is particularly preferably a tert-butyl group in order to achieve a high chroma, a wide-color-gamut reproduction capability, and high-quality process black.

When $R_4$ in General Formula (1) represents an alkyl group, examples of the alkyl group include, but are not particularly limited to, alkyl groups having 1 to 4 carbon atoms. Examples of such alkyl groups include a methyl group, an ethyl group, an n-propyl group, an iso-propyl group, an n-butyl group, an iso-butyl group, a 2-methylbutyl group, and a 2,3,3-trimethylbutyl group. In particular, a methyl group is preferably used in order to achieve a high chroma, a wide-color-gamut reproduction capability, and high-quality process black.

When $R_4$ in General Formula (1) represents an aryl group, an example of the aryl group is, but not particularly limited to, a phenyl group. Examples of the substituent of the aryl group having a substituent include a methyl group and a methoxy group. Specific examples of the aryl group having a substituent include a 2-methylphenyl group, a 3-methylphenyl group, a 4-methylphenyl group, a 4-methoxyphenyl group, and a 3,5-dimethylphenyl group.

When $R_5$ in General Formula (1) represents an alkyl group, examples of the alkyl group include, but are not particularly limited to, a methyl group, an ethyl group, an n-propyl group, an iso-propyl group, an n-butyl group, and an iso-butyl group. In particular, a methyl group is preferably used in order to achieve a high chroma, a wide-color-gamut reproduction capability, and high-quality process black.

When $R_5$ in General Formula (1) represents an aryl group, examples of the aryl group include, but are not particularly limited to, a phenyl group having no substituents and a phenyl group having a substituent.

When $R_5$ in General Formula (1) represents —N(—$R_6$)$R_7$ and at least one of $R_6$ and $R_7$ represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, a methyl group is preferably used in order to achieve a high chroma, a wide-color-gamut reproduction capability, and high-quality process black.

When $R_5$ in General Formula (1) represents —N(—$R_6$)$R_7$ and at least one of $R_6$ and $R_7$ represents an acyl group, examples of the acyl group include, but are not particularly limited to, alkylcarbonyl groups having 2 to 30 carbon atoms which may be substituted and arylcarbonyl groups having 7 to 30 carbon atoms which may be substituted. Specific examples of such acyl groups include an acetyl group, a propionyl group, a pivaloyl group, a benzoyl group, and a naphthoyl group.

When $R_5$ in General Formula (1) represents —N(—$R_6$)$R_7$ and at least one of $R_6$ and $R_7$ represents a —C(=O)-A group (where A represents a hetero ring), examples of the —C(=O)-A group include a 2-pyridylcarbonyl group and a 2-furylcarbonyl group.

When $R_5$ in General Formula (1) represents —N(—$R_6$)$R_7$ and $R_6$ and $R_7$ are bonded to each other to form a ring, examples of the ring include, but are not particularly limited to, a piperidine ring, a piperazine ring, and a morpholine ring.

In particular, at least one of $R_6$ and $R_7$ is preferably an alkyl group in order to improve lightfastness. Specifically, the alkyl group is preferably a methyl group in order to achieve a high chroma, a wide-color-gamut reproduction capability, and high-quality process black.

The compound having a structure represented by General Formula (1) which is included in the magenta dye can be synthesized in accordance with the publicly known method described in WO92/19684. The compound represented by General Formula (1) has a cis-trans constitutional isomer, which is also within the scope of the present invention.

Preferred examples of the compound represented by General Formula (1) include, but are not limited to, the compounds (1) to (43) below.

Compound (1)

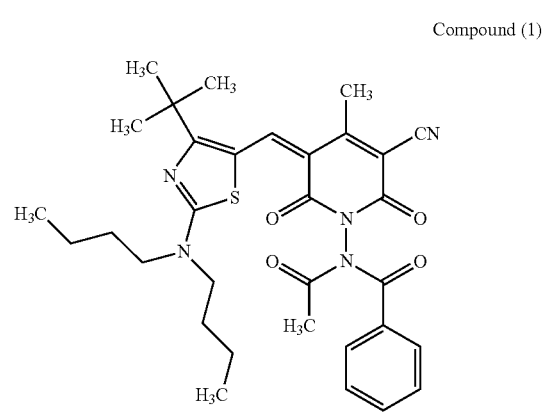

Compound (2)
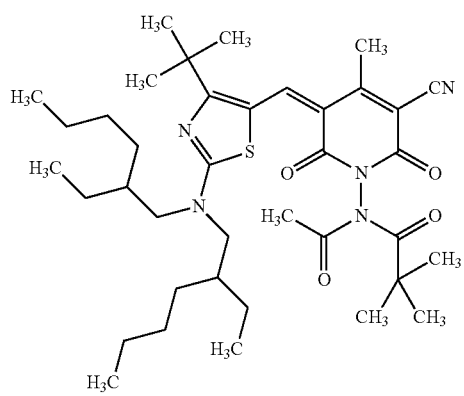
Compound (3)
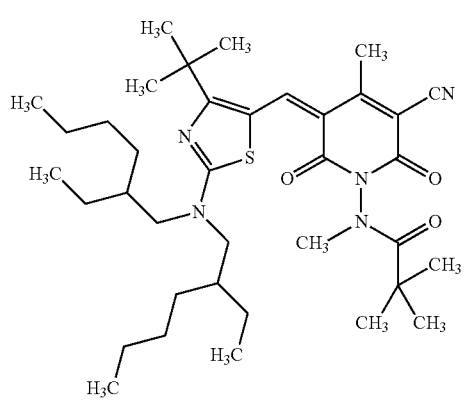
Compound (4)
Compound (5)
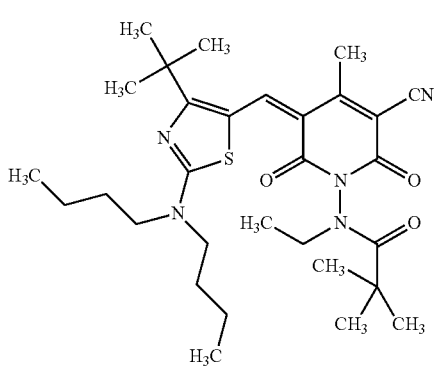
Compound (6)
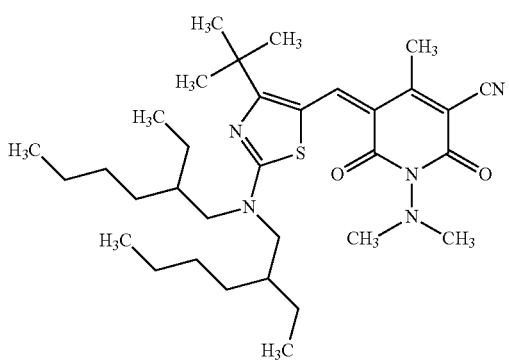
Compound (7)
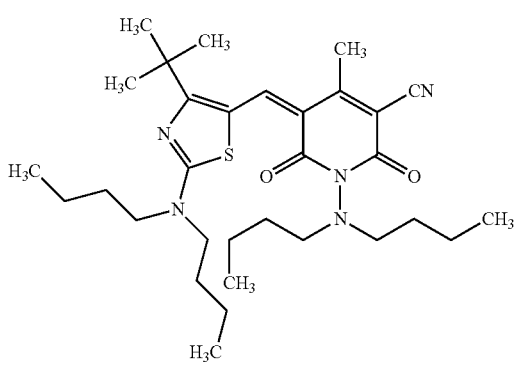
Compound (8)
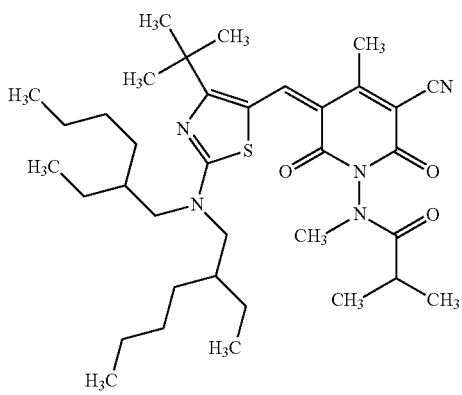

Compound (9)
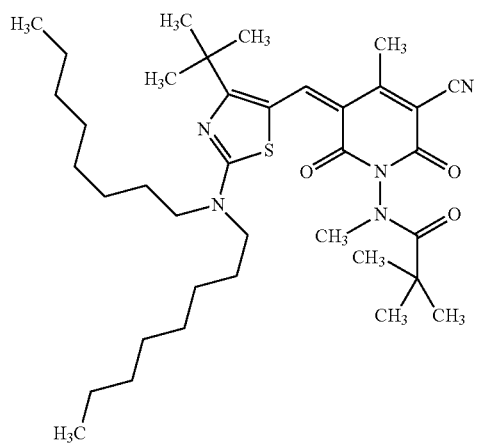
Compound (10)
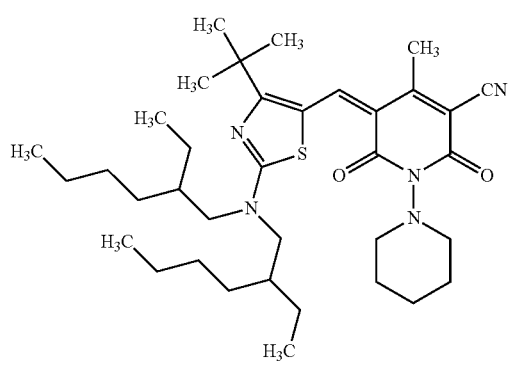
Compound (11)
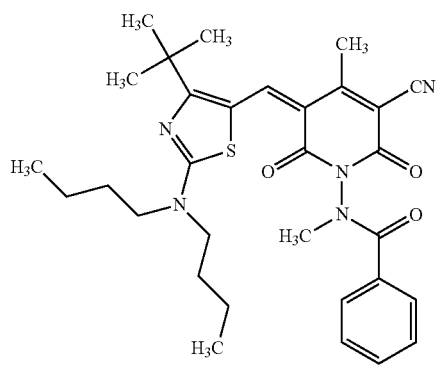
Compound (12)
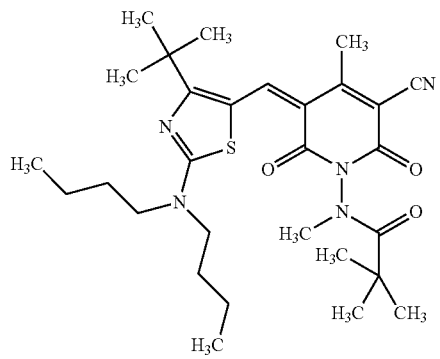
Compound (13)
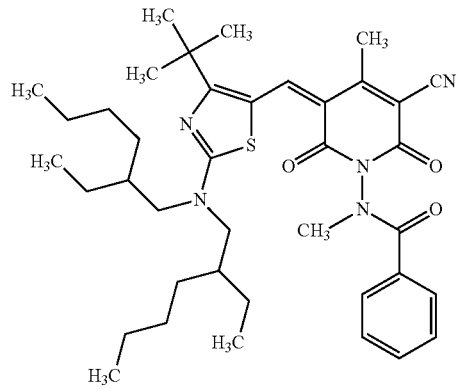
Compound (14)
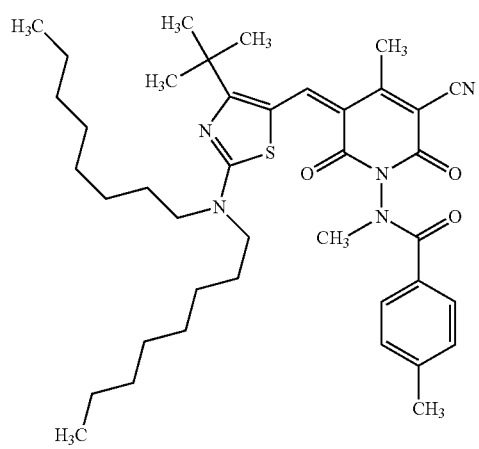
Compound (15)
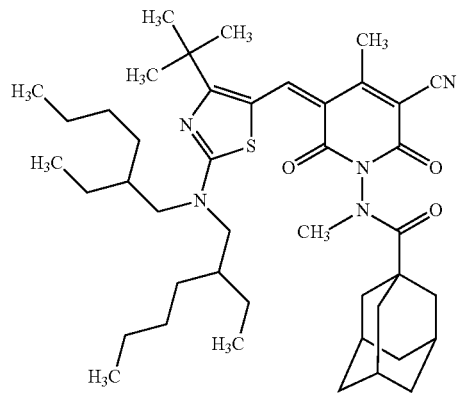

Compound (16)
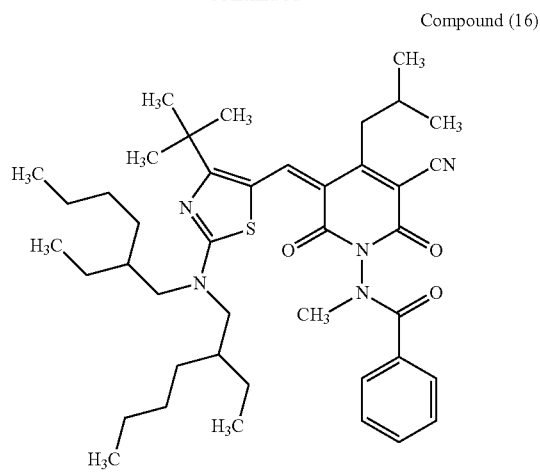
Compound (17)
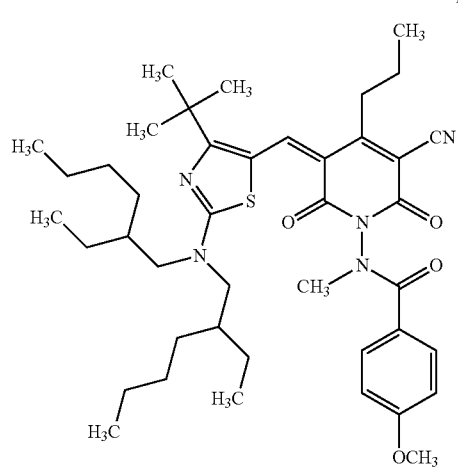
Compound (18)
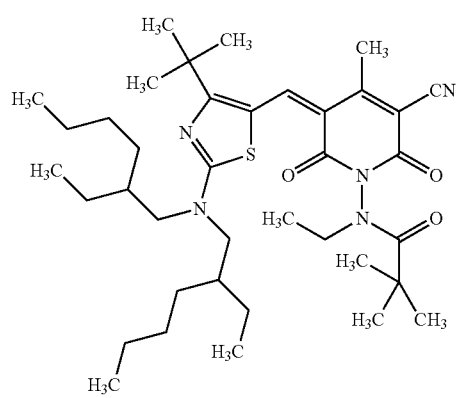
Compound (19)
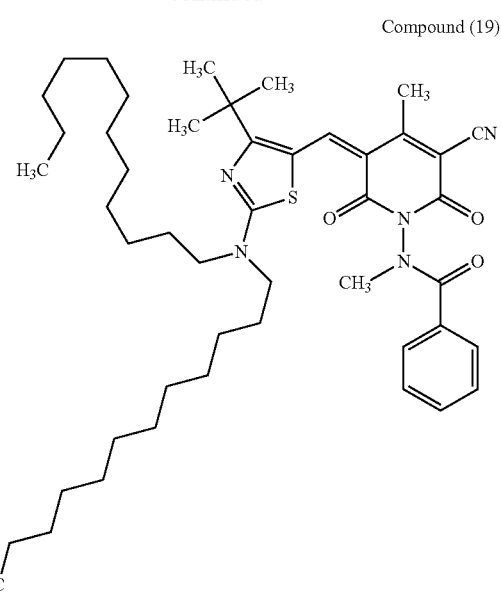
Compound (20)
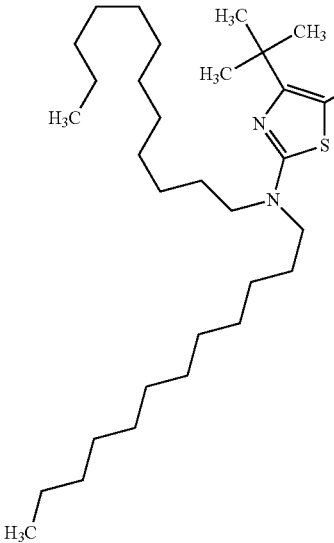
Compound (21)
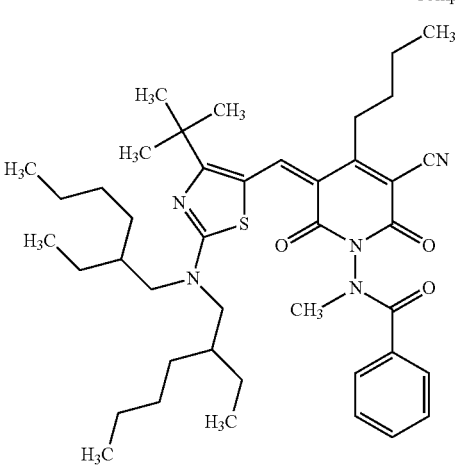

Compound (22)
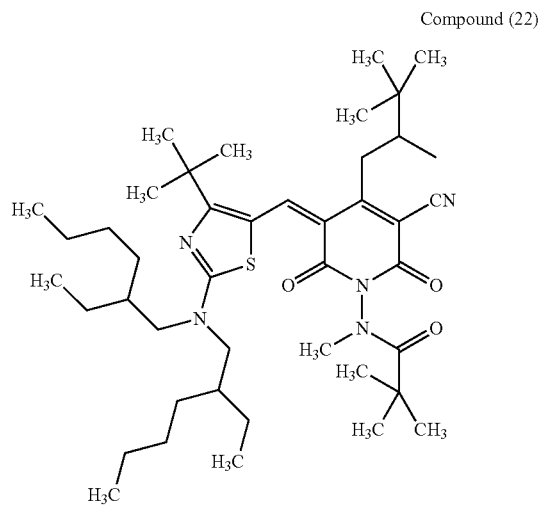
Compound (23)
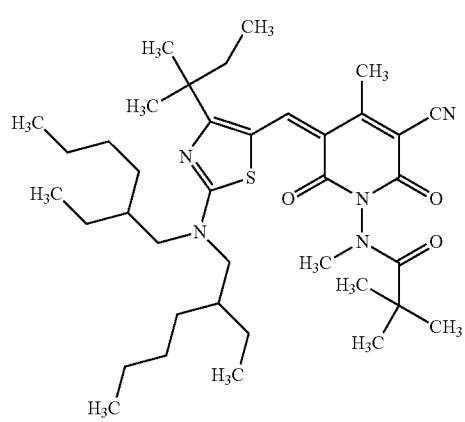
Compound (24)
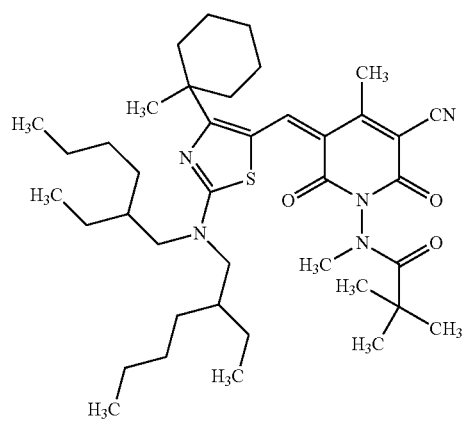
Compound (24)
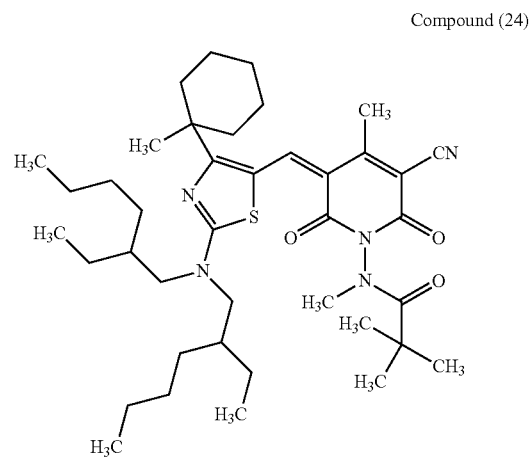 [SMILES: CCCCC(CC)CN(CC(CC)CCCC)c1nc(C2(C)CCCCC2)c(/C=C2\C(=O)N(N(C)C(=O)C(C)(C)C)C(=O)C(C#N)=C2C)s1]
Compound (25)
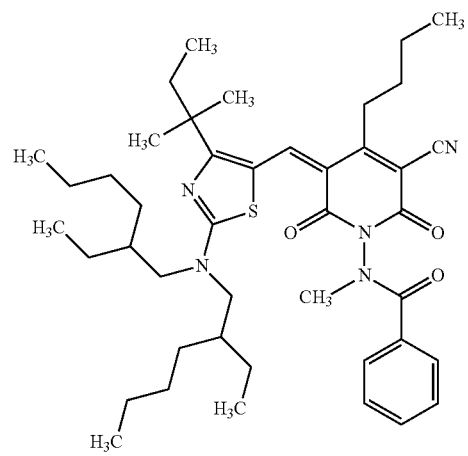
Compound (26)
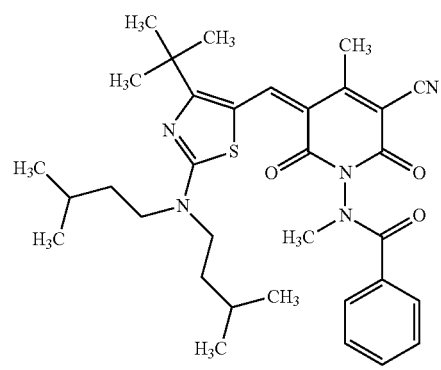

Compound (27)
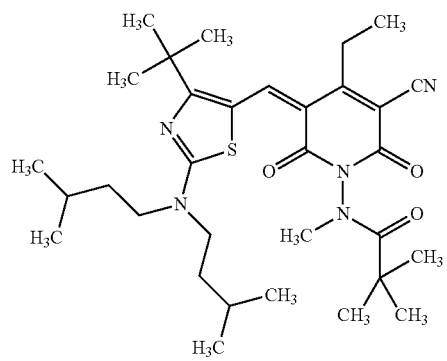
Compound (28)
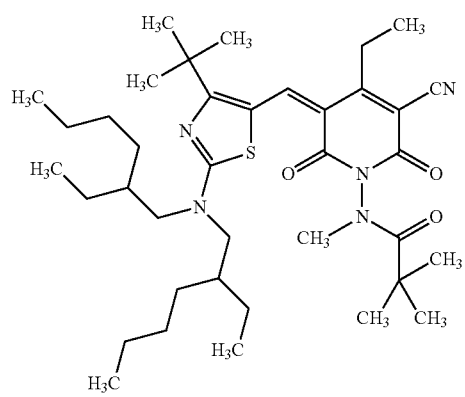
Compound (29)
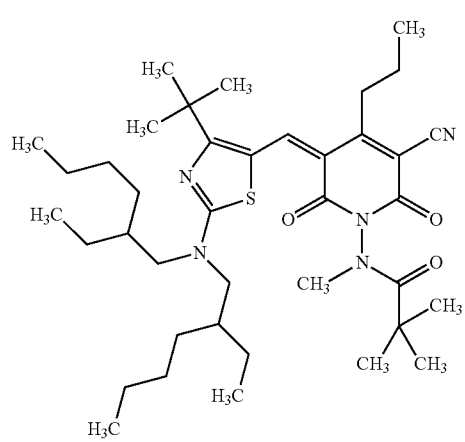
Compound (30)
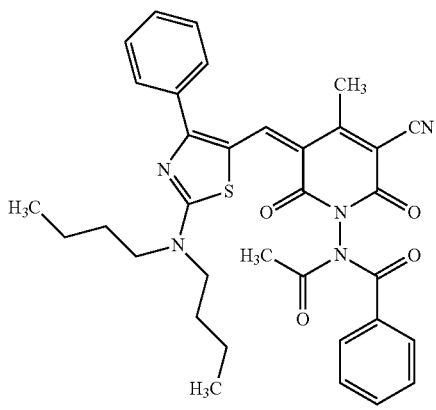
Compound (31)
Compound (32)
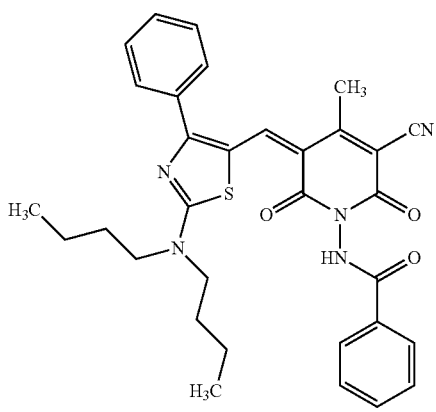

Compound (33)
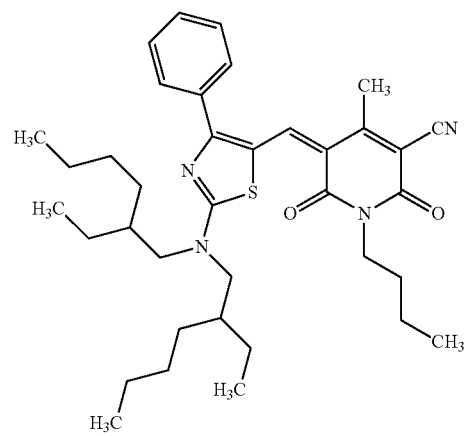
Compound (34)
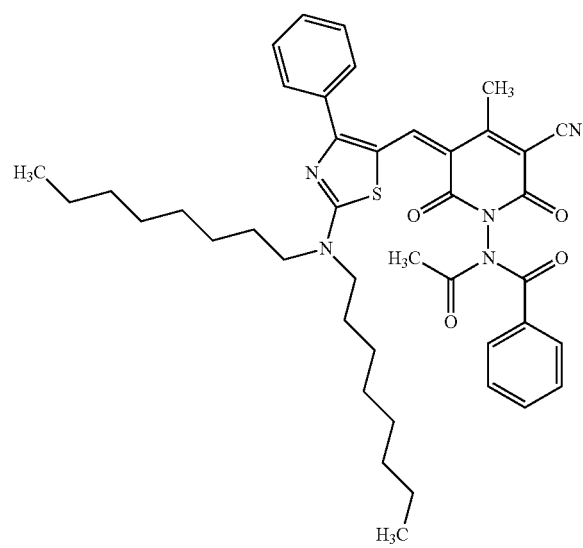
Compound (35)
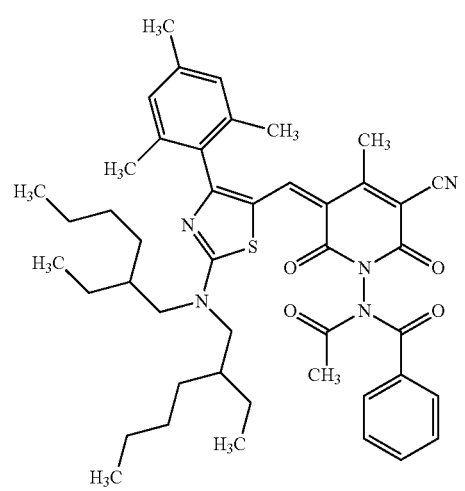
Compound (36)
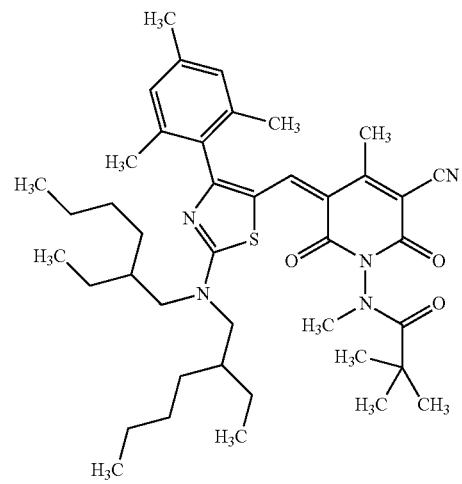
Compound (37)
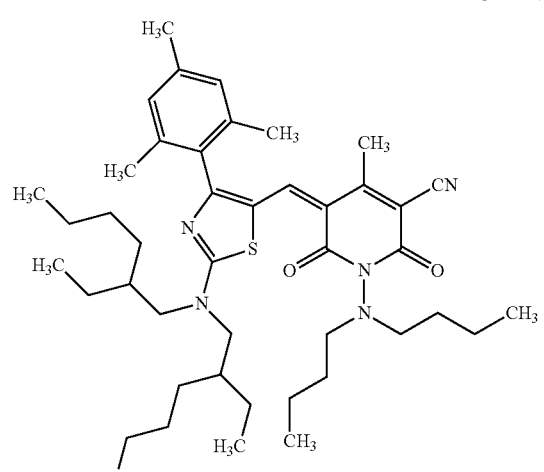
Compound (38)
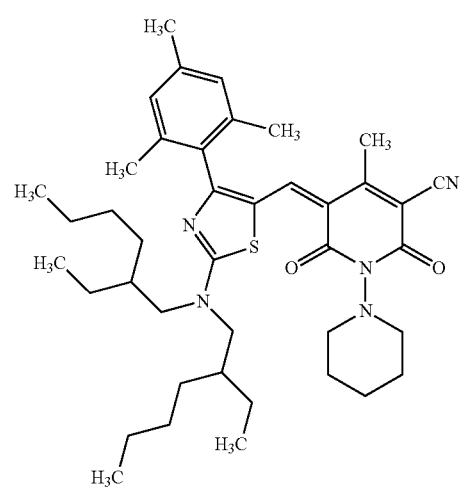

Compound (39)

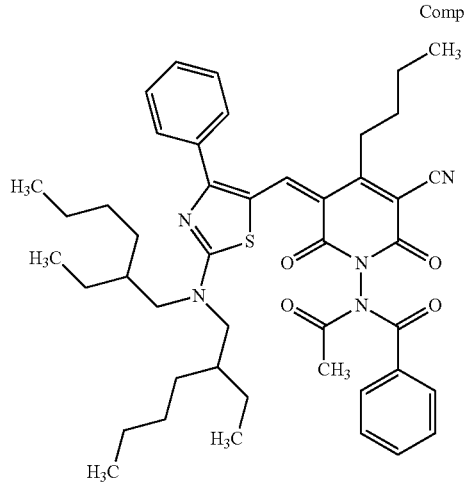

Compound (40)

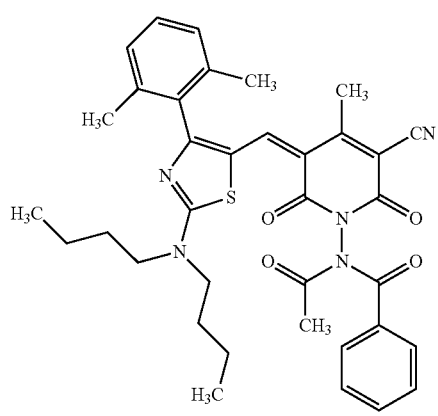

Compound (41)

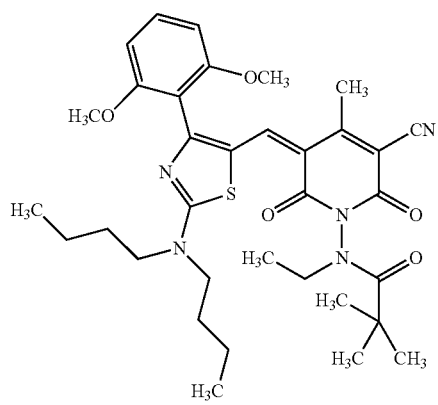

Compound (42)

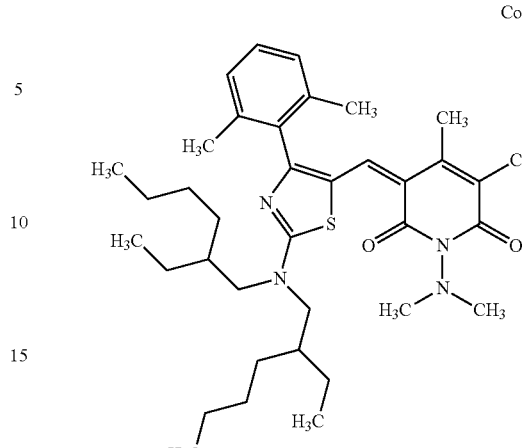

Compound (43)

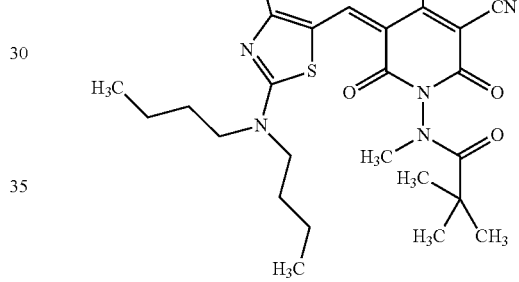

Among these compounds, the compounds (1) to (29) are preferably included in the magenta dye, and the compounds (1), (3), (4), (6), (10), (11), (12), (13), (16), (21), (22), (28), and (29) are more preferably included in the magenta dye. The compounds (3), (4), (11), (12), (13), (28), and (29) are particularly preferably used in order to achieve a high chroma, a wide-color-gamut reproduction capability, and high-quality process black.

Yellow Dye

The yellow dye represented by General Formula (2) is described below.

General Formula (2)

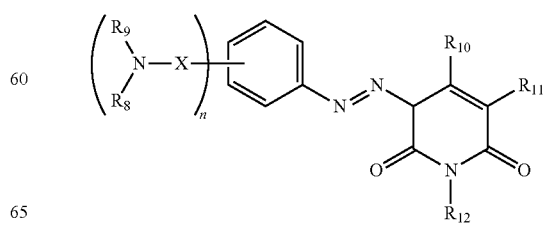

[In General Formula (2), $R_8$ represents an alkyl group;

$R_9$ represents a hydrogen atom or an alkyl group;

$R_{10}$ represents an alkyl group, an aryl group having no substituents, an aryl group having a substituent, or an amino group;

$R_{11}$ represents a hydrogen atom, a cyano group, a carbamoyl group, a carboxylic acid ester group, or a carboxylic acid amide group;

$R_{12}$ represents a hydrogen atom, an alkyl group, an aryl group, or —N(—$R_{13}$)$R_{14}$, $R_{13}$ and $R_{14}$ each independently represent a hydrogen atom, an alkyl group, a formyl group, an acyl group, or —C(=O)-A (where A represents a hetero ring), and $R_{13}$ and $R_{14}$ may be bonded to each other to form a ring;

X represents a carbonyl group or a sulfonyl group; and n is an integer of 1 to 3.]

When $R_9$ in General Formula (2) represents an alkyl group, examples of the alkyl groups represented by $R_8$ and $R_9$ in General Formula (2) include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, 2-ethylpropyl, and a 2-ethylhexyl group.

In particular, $R_8$ and $R_9$ are preferably each independently an ethyl group, an n-butyl group, a sec-butyl group, a dodecyl group, a cyclohexyl group, a methylcyclohexyl group, a 2-ethylpropyl, or a 2-ethylhexyl group and are more preferably each independently an n-butyl group or a 2-ethylhexyl group in order to improve lightfastness. $R_8$ and $R_9$ are preferably the same alkyl groups in order to achieve a high chroma, a wide-color-gamut reproduction capability, and high-quality process black.

When $R_{10}$ in General Formula (2) represents an alkyl group, examples of the alkyl group include, but are not particularly limited to, a methyl group, an ethyl group, a propyl group, and a butyl group.

When $R_{10}$ in General Formula (2) represents an aryl group having no substituents, an example of the aryl group is, but not particularly limited to, a phenyl group. The aryl group may have a substituent such as a methyl group.

When $R_{10}$ in General Formula (2) represents an amino group, examples of the amino group include, but are not particularly limited to, an amino group and a dimethylamino group.

In particular, $R_{10}$ is preferably an alkyl group and is more preferably a methyl group in order to achieve a high chroma, a wide-color-gamut reproduction capability, and high-quality process black.

When $R_{11}$ in General Formula (2) represents a carboxylic acid ester group, examples of the carboxylic acid ester group include, but are not particularly limited to, a carboxylic acid methyl ester group and a carboxylic acid ethyl ester group.

When $R_{11}$ in General Formula (2) represents a carboxylic acid amide group, examples of the carboxylic acid amide group include, but are not particularly limited to, carboxylic acid dialkylamide groups such as a carboxylic acid dimethylamide group and a carboxylic acid diethylamide group and carboxylic acid monoalkylamide groups such as a carboxylic acid methylamide group and a carboxylic acid ethylamide group.

In General Formula (2), $R_{11}$ is preferably a cyano group in order to achieve a high chroma, a wide-color-gamut reproduction capability, and high-quality process black.

When $R_{12}$ in General Formula (2) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. $R_{12}$ is preferably a methyl group, an ethyl group, an n-propyl group, an iso-propyl group, an n-butyl group, or a 2-ethylhexyl group and is particularly preferably an ethyl group or an n-propyl group in order to achieve a high chroma, a wide-color-gamut reproduction capability, and high-quality process black.

When $R_{12}$ in General Formula (2) represents an aryl group having no substituents, an example of the aryl group is, but not particularly limited to, a phenyl group. The aryl group may have a substituent such as a methyl group.

When at least one of $R_{13}$ and $R_{14}$ in General Formula (2) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group.

When at least one of $R_{13}$ and $R_{14}$ in General Formula (2) represents an acyl group, examples of the acyl group include, but are not particularly limited to, an acetyl group, an ethylhexanoyl group, and a benzoyl group.

In particular, at least one of $R_{13}$ and $R_{14}$ is preferably an alkyl group in order to improve lightfastness. Specifically, the alkyl group is preferably a methyl group in order to achieve a high chroma, a wide-color-gamut reproduction capability, and high-quality process black.

Examples of the ring formed by $R_{13}$ and $R_{14}$ in General Formula (2) which are bonded to each other include a pyrrolidine ring, a piperidine ring, an azepane ring, and an azocane ring. However, examples of such ring are not particularly limited as long as high chroma, wide-color-gamut reproduction capability, and high-quality process black can be achieved.

In General Formula (2), X is preferably a carbonyl group in order to achieve a high chroma, a wide-color-gamut reproduction capability, and high-quality process black.

In General Formula (2), n is an integer of 1 to 3, and n is preferably 1 in order to achieve a high chroma, a wide-color-gamut reproduction capability, and high-quality process black.

General Formula (2) represents an azo form. However, a tautomer of the azo form, that is, a hydrazo form, is also within the scope of the present invention.

The compound having the structure represented by General Formula (2) can be synthesized in accordance with the publicly known method described in WO08/114886.

Preferred examples of the compound represented by General Formula (2) include, but are not limited to, the compounds (44) to (53) below.

Compound (44)
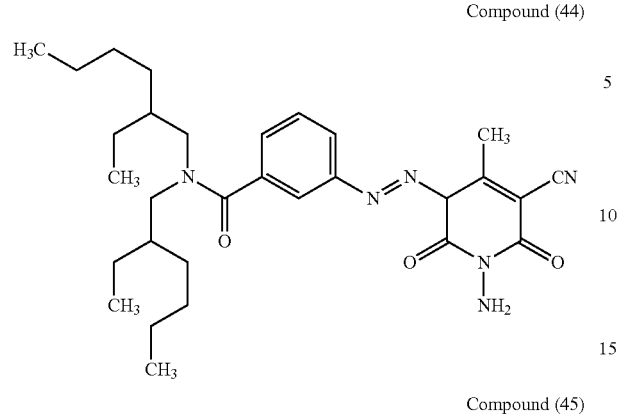
Compound (45)
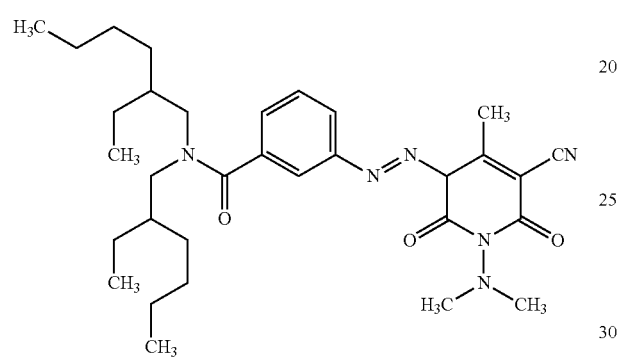
Compound (46)
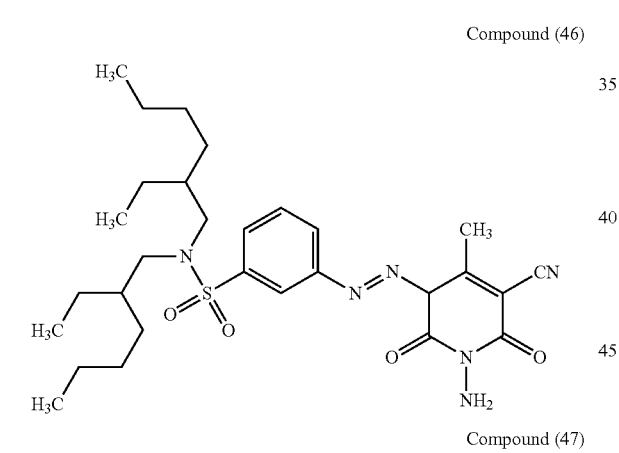
Compound (47)
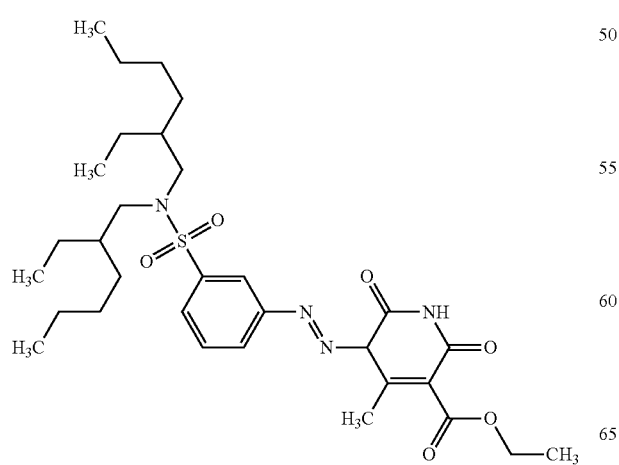
Compound (48)
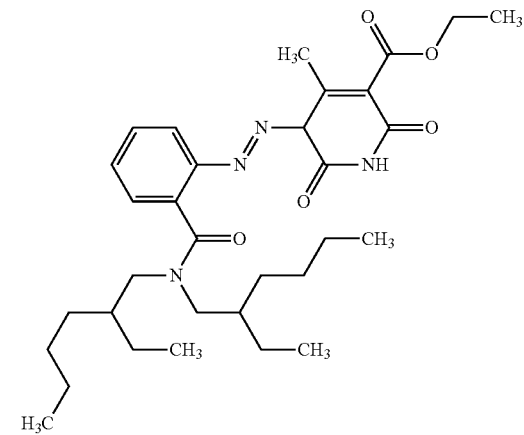
Compound (49)
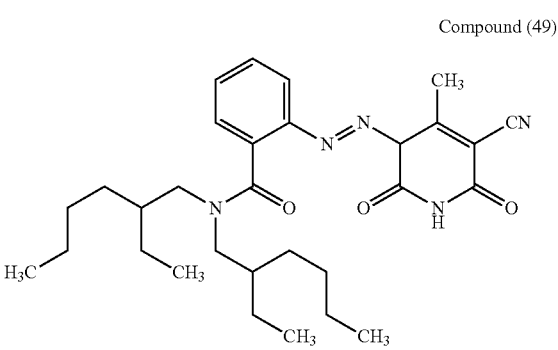
Compound (50)
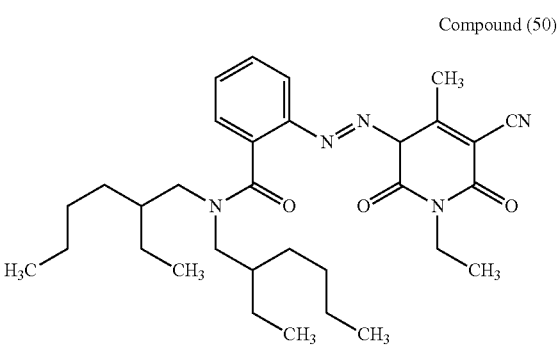
Compound (51)
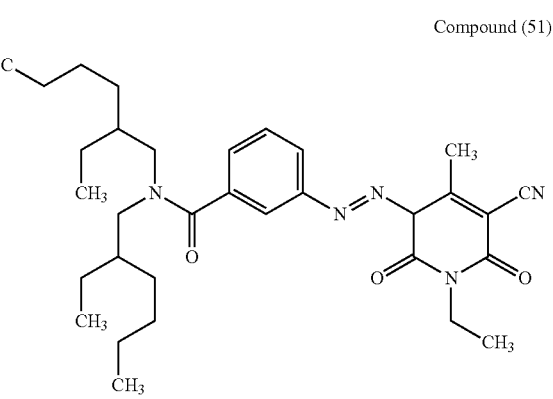

Compound (52)

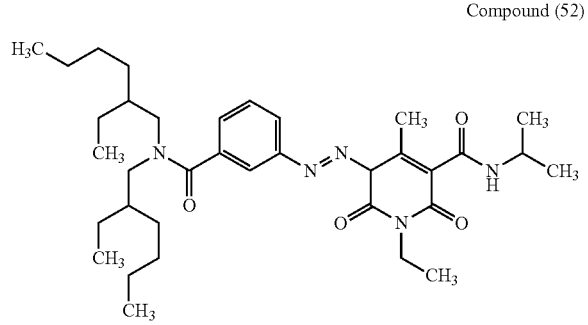

Compound (53)

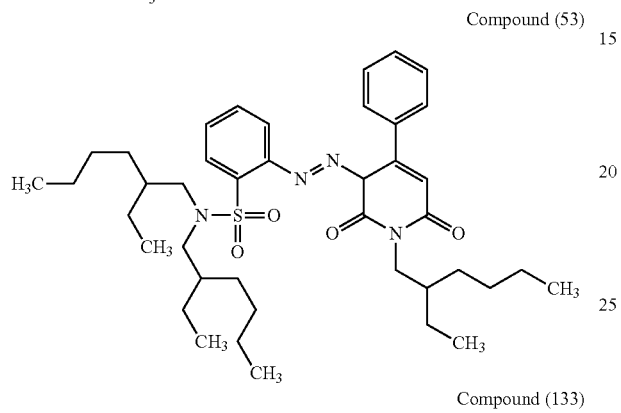

Compound (133)

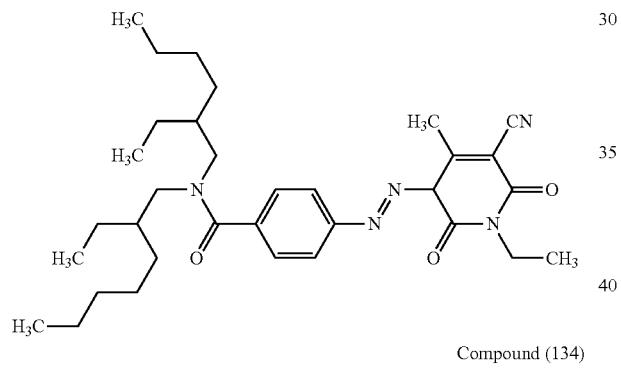

Compound (134)

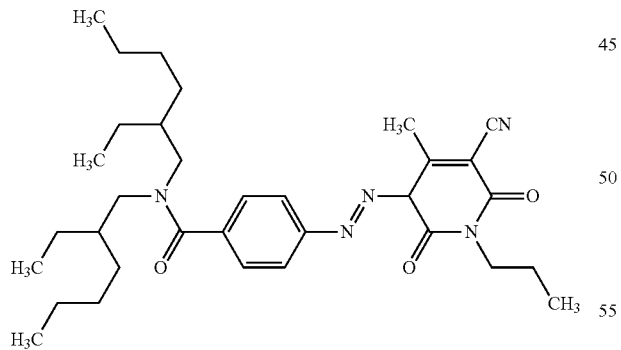

Among these compounds, the compounds (44), (45), (48), (49), (50), (51), (133), and (134) are preferably included in the yellow dye, and the compounds (50), (51), (133), and (134) are more preferably included in the yellow dye in order to achieve a high chroma, a wide-color-gamut reproduction capability, and high-quality process black.

Existing yellow dyes may also be used for preparing yellow. Examples of such yellow dyes include, but are not limited to, the compounds (135) and (136).

Compound (135)

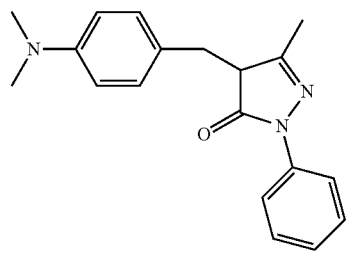

Compound (136)

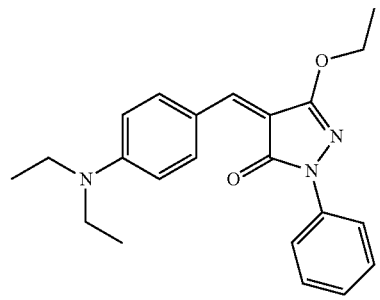

Cyan Dye

The cyan dye represented by General Formula (3) is described below.

General Formula (3)

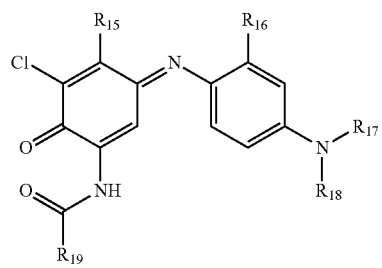

[In General Formula (3), $R_{15}$ to $R_{19}$ each independently represent an alkyl group, an aryl group having no substituents, or an aryl group having a substituent.]

When one or more of $R_{15}$ to $R_{19}$ in General Formula (3) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When one or more of $R_{15}$ to $R_{19}$ in General Formula (3) represent an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black.

Preferred examples of the compound represented by General Formula (3) include, but are not limited to, the compounds (54) to (60) below.

Compound (54)
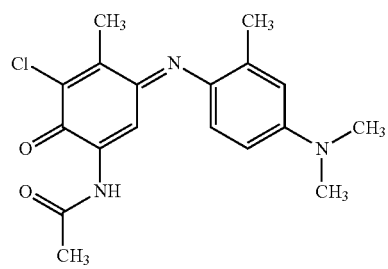

Compound (55)
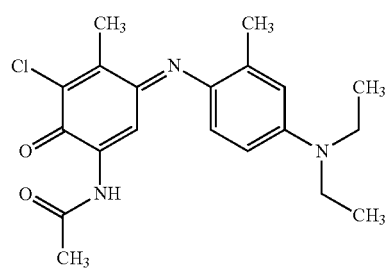

Compound (56)
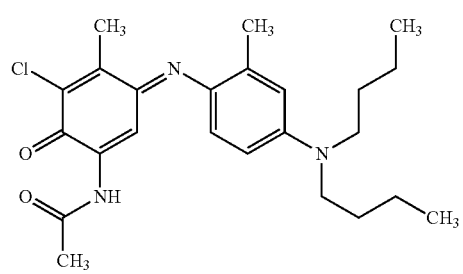

Compound (57)
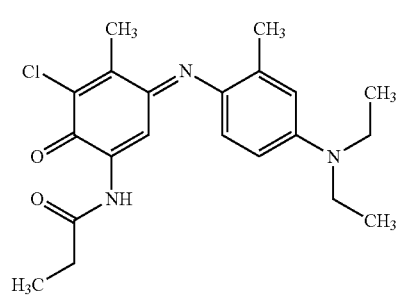

Compound (58)
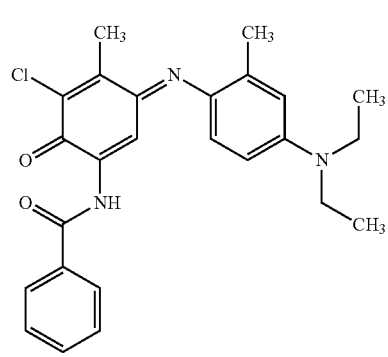

Compound (59)
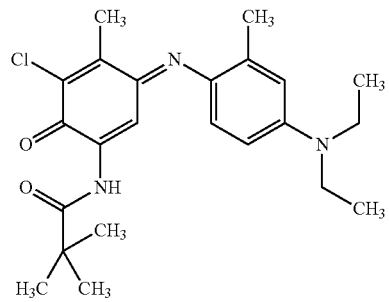

Compound (60)
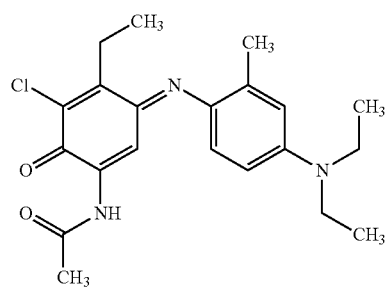

Among these compounds, the compounds (54), (55), and (56) are preferably included in the cyan dye, and the compound (55) is more preferably included in the cyan dye in order to achieve a high chroma, a wide-color-gamut reproduction capability, and high-quality process black.

The cyan dye represented by General Formula (4) is described below.

General Formula (4)
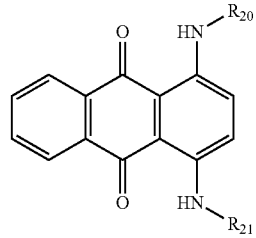

[In General Formula (4), $R_{20}$ and $R_{22}$ each independently represent an alkyl group, an aryl group having no substituents, or an aryl group having a substituent.]

When at least one of $R_{20}$ and $R_{22}$ in General Formula (4) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When at least one of $R_{20}$ and $R_{21}$ in General Formula (4) represents an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group.

Preferred examples of the compound represented by General Formula (4) include, but are not limited to, the compounds (61) to (66) below.

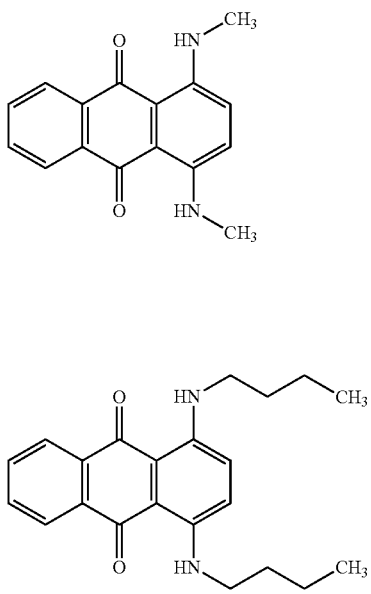

Compound (61)

Compound (62)

Compound (63)

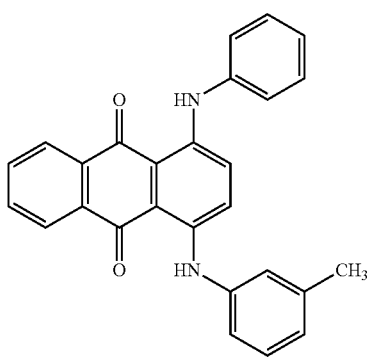

Compound (64)

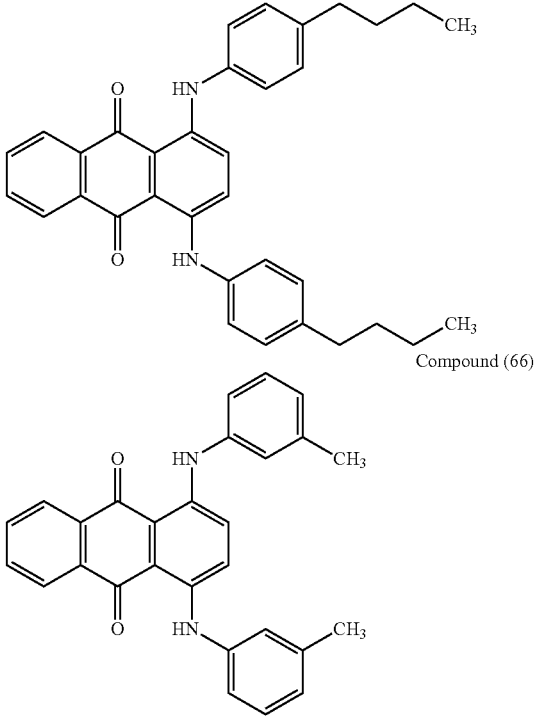

Compound (65)

Compound (66)

Among these compounds, the compounds (62), (63), and (64) are preferably included in the cyan dye, and the compound (63) is more preferably included in the cyan dye in order to achieve a high chroma, a wide-color-gamut reproduction capability, and high-quality process black.

The cyan dye represented by General Formula (5) is described below.

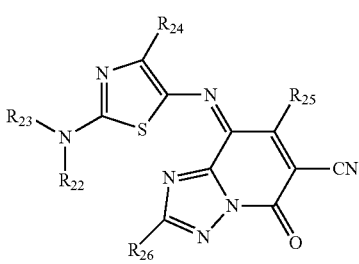

General Formula (5)

[In General Formula (5), $R_{22}$ to $R_{26}$ each independently represent an alkyl group, an aryl group having no substituents, or an aryl group having a substituent.]

When one or more of $R_{22}$ to $R_{26}$ in General Formula (5) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When one or more of $R_{22}$ to $R_{26}$ in General Formula (5) represent an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black.

Preferred examples of the compound represented by General Formula (5) include, but are not limited to, the compounds (67) to (72) below.

Compound (67)

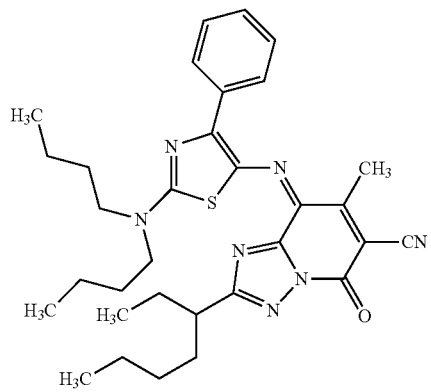

Compound (68)

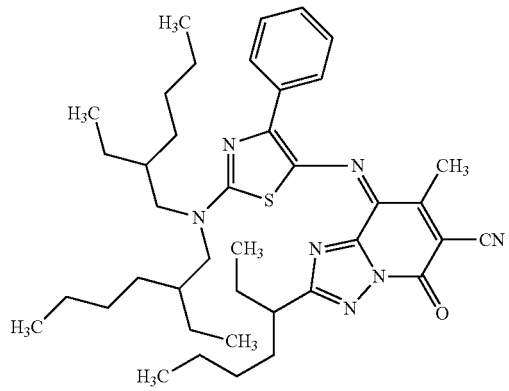

Compound (69)

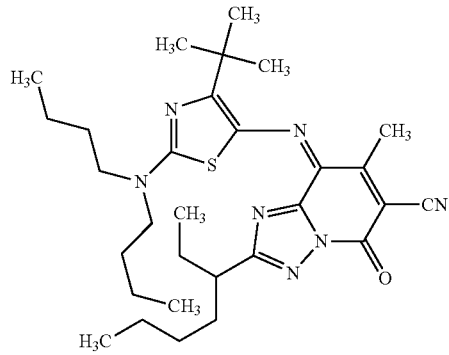

Compound (70)

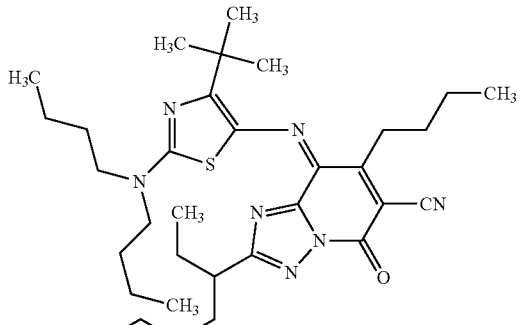

Compound (71)

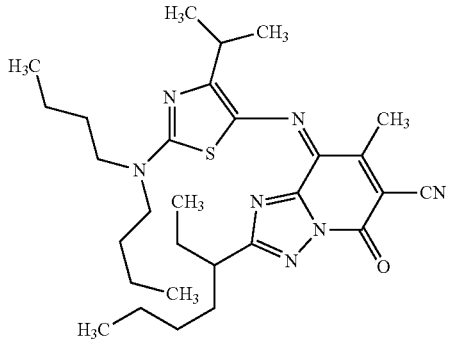

Compound (72)

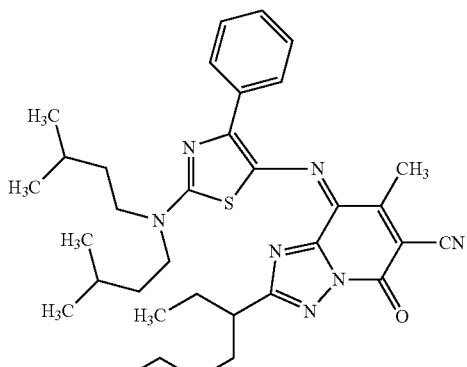

Among these compounds, the compounds (67), (68), and (72) are preferably included in the cyan dye, and the compound (67) is more preferably included in the cyan dye in order to achieve a high chroma, a wide-color-gamut reproduction capability, and high-quality process black.

Magenta Dye

The magenta dye represented by General Formula (6) is described below.

General Formula (6)

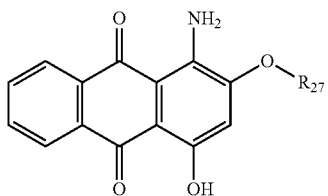

[In General Formula (6), $R_{27}$ represents an alkyl group, an aryl group having no substituents, an aryl group having a substituent, or —$(R_{47}$—O)n-$R_{48}$, $R_{47}$ represents an alkylene, and $R_{48}$ represents an alkyl group.]

When $R_{27}$ in General Formula (6) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When $R_{27}$ in General Formula (6) represents an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group or an alkoxy group.

When $R_{33}$ in General Formula (6) represents a —$(R_{47}$—O)n-$R_{48}$ group, the total number of carbon atoms in the —$(R_{47}$—O)n-$R_{48}$ group is preferably, but not particularly limited to, 20 or less.

Preferred examples of the compound represented by General Formula (6) include, but are not limited to, the compounds (73) to (81) below.

Compound (73)

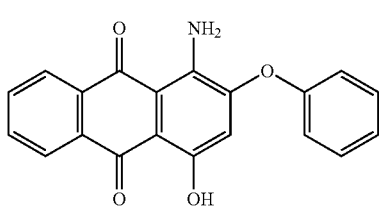

Compound (74)

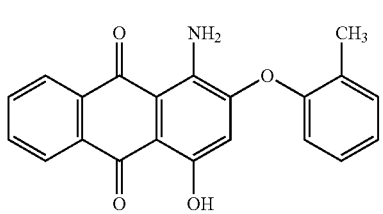

Compound (75)

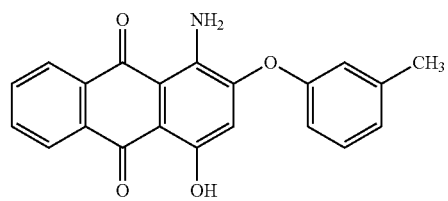

Compound (76)

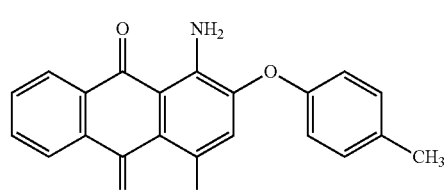

Compound (77)

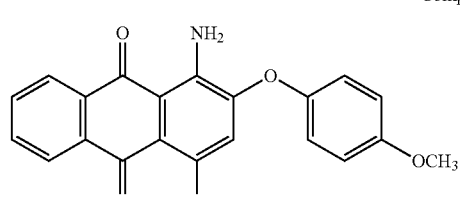

Compound (78)

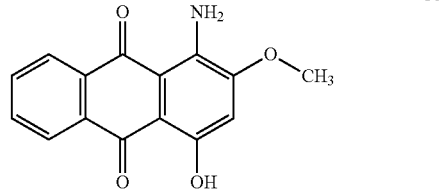

Compound (79)

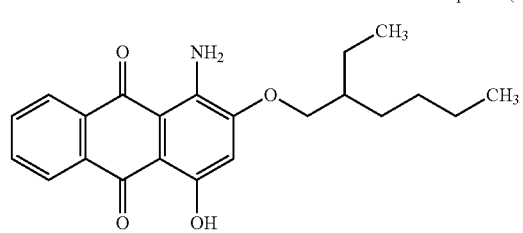

Compound (80)

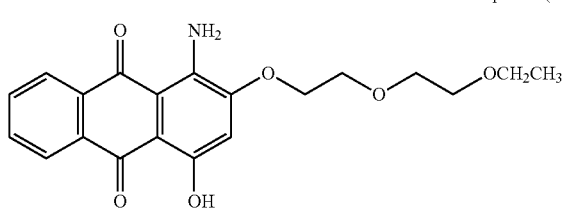

Compound (81)

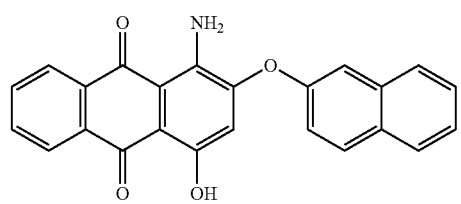

Among these compounds, the compounds (73), (74), (75), (76), and (77) are preferably included in the magenta dye. The compounds (73) and (75) are more preferably included in the magenta dye in order to achieve a high chroma, a wide-color-gamut reproduction capability, and high-quality process black.

The magenta dye represented by General Formula (7) is described below.

General Formula (7)

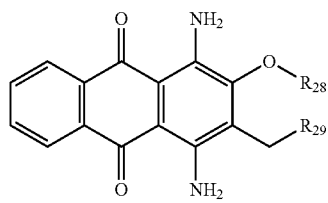

[In General Formula (7), $R_{28}$ and $R_{29}$ each independently represent an alkyl group, an aryl group having no substituents, or an aryl group having a substituent.]

When at least one of $R_{28}$ and $R_{29}$ in General Formula (7) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When at least one of $R_{28}$ and $R_{29}$ in General Formula (7) represents an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group.

Preferred examples of the compound represented by General Formula (7) include, but are not limited to, the compounds (82) to (90) below.

Compound (82)

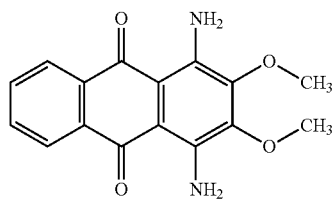

Compound (83)

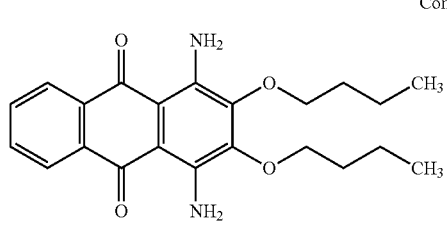

Compound (84)

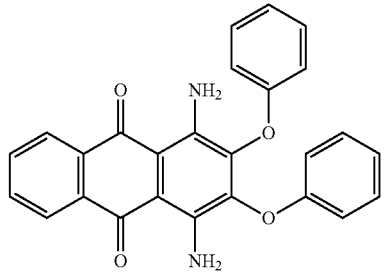

Compound (85)

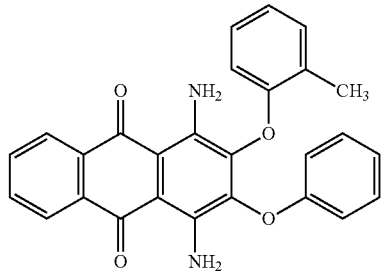

Compound (86)

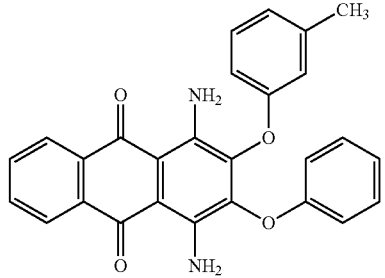

Compound (87)

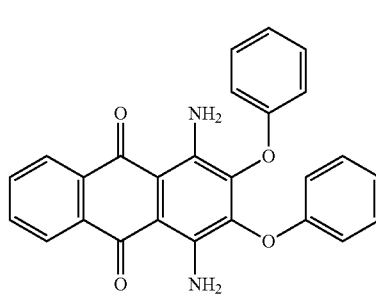

Compound (88)

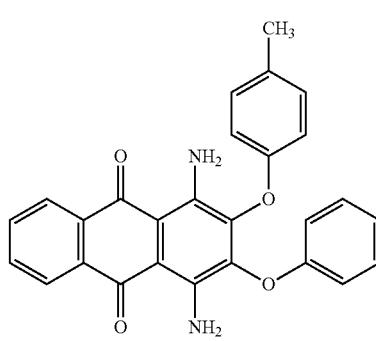

Compound (89)

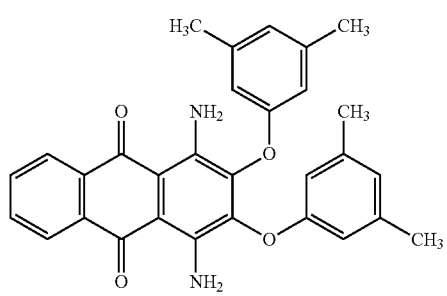

Compound (90)

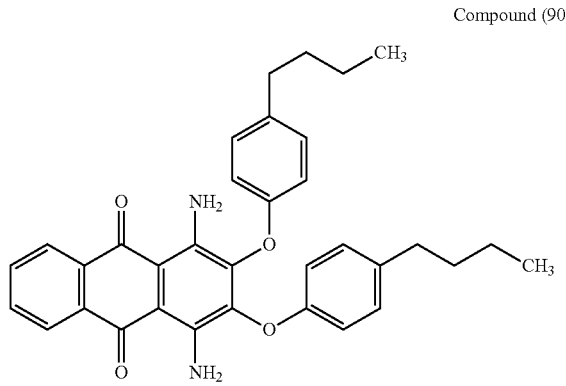

Among these compounds, the compounds (84), (85), (86), (87), (88), and (89) are preferably included in the magenta dye. The compounds (84), (88), and (89) are more preferably included in the magenta dye in order to achieve a high chroma, a wide-color-gamut reproduction capability, and high-quality process black.

The magenta dye represented by General Formula (8) is described below.

General Formula (8)

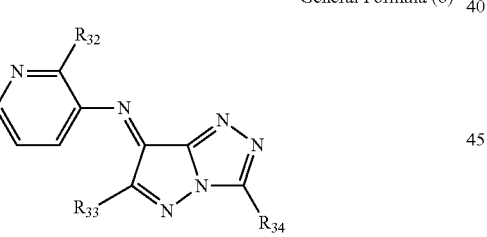

[In General Formula (8), $R_{30}$ to $R_{34}$ each independently represent an alkyl group, an aryl group having no substituents, or an aryl group having a substituent.]

When one or more of $R_{30}$ to $R_{34}$ in General Formula (8) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as methyl group or an ethyl group, is preferably used in order to achieve a high chroma, a wide-color-gamut reproduction capability, and high-quality process black.

When one or more of $R_{30}$ to $R_{34}$ in General Formula (8) represent an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group or an alkoxy group.

Preferred examples of the compound represented by General Formula (8) include, but are not limited to, the compounds (91) to (99) below.

Compound (91)

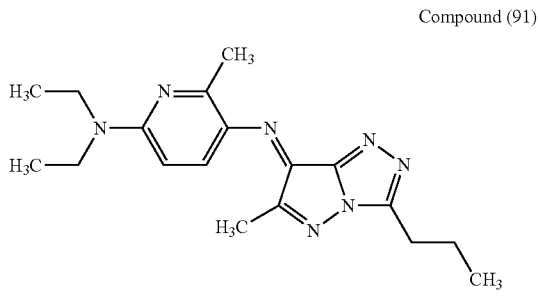

Compound (92)

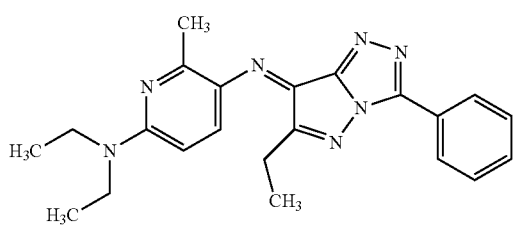

Compound (93)

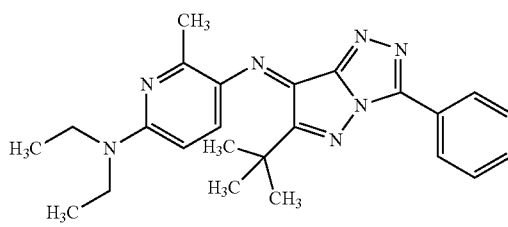

Compound (94)

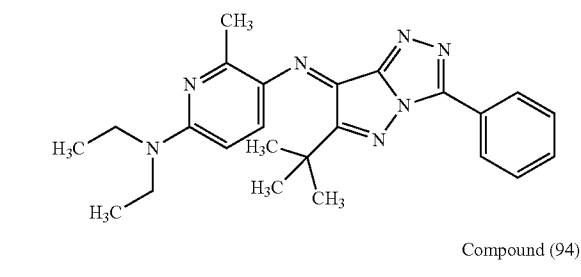

Compound (95)

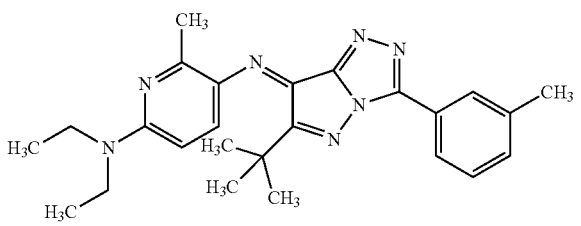

Compound (96)

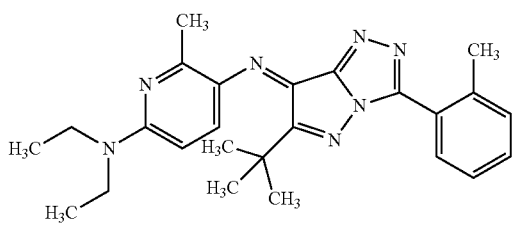

Compound (97)

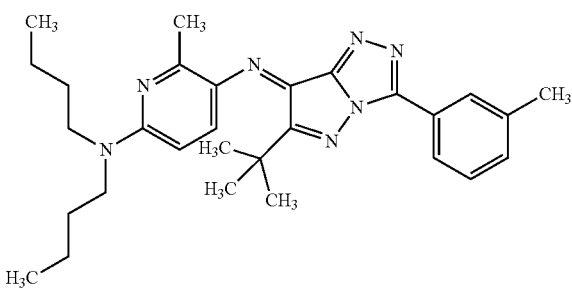

Compound (98)

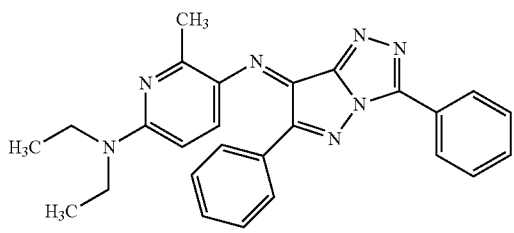

Compound (99)

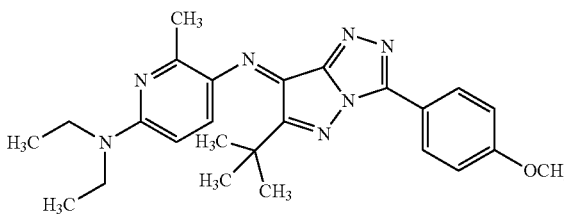

Among these compounds, the compounds (93), (94), (95), (96), and (97) are preferably included in the magenta dye. The compounds (94), (95), and (96) are more preferably included in the magenta dye in order to achieve a high chroma, a wide-color-gamut reproduction capability, and high-quality process black.

The magenta dye represented by General Formula (9) is described below.

General Formula (9)

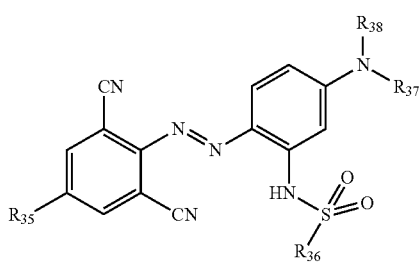

[In General Formula (9), $R_{35}$ to $R_{38}$ each independently represent an alkyl group, an aryl group having no substituents, or an aryl group having a substituent.]

When one or more of $R_{35}$ to $R_{38}$ in General Formula (9) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When one or more of $R_{35}$ to $R_{38}$ in General Formula (9) represent an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group.

Preferred examples of the compound represented by General Formula (9) include, but are not limited to, the compounds (100) to (108) below.

Compound (100)

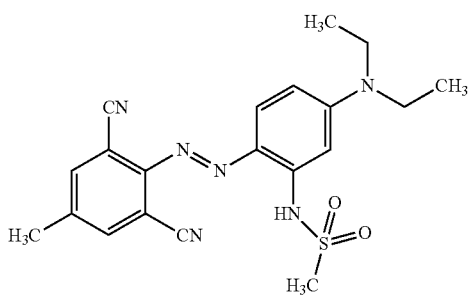

Compound (101)

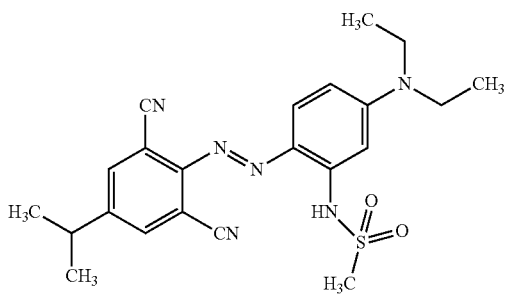

-continued

Compound (102)
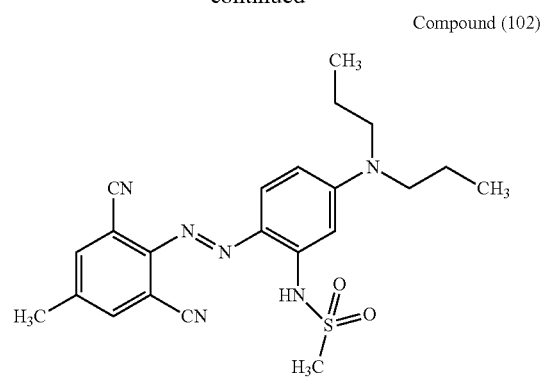

Compound (103)
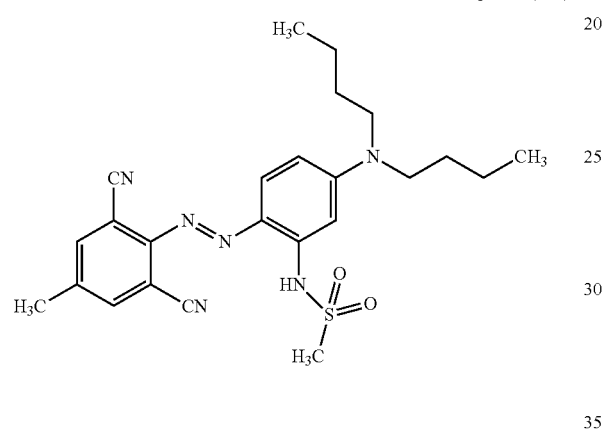

Compound (104)
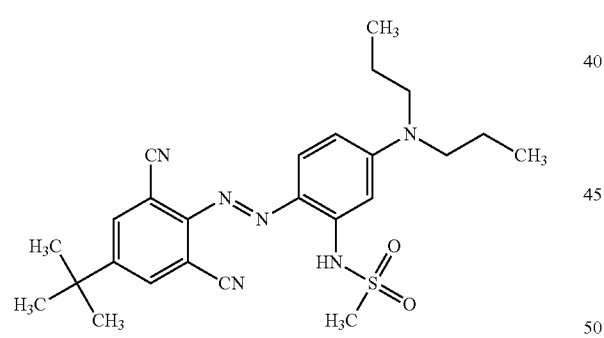

Compound (105)
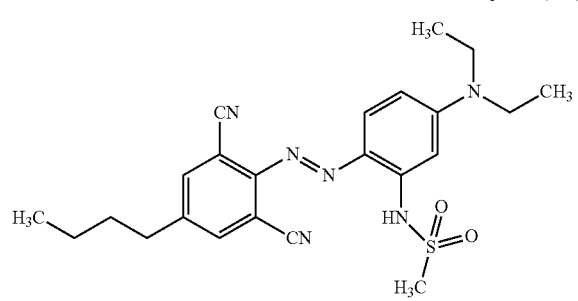

-continued

Compound (106)
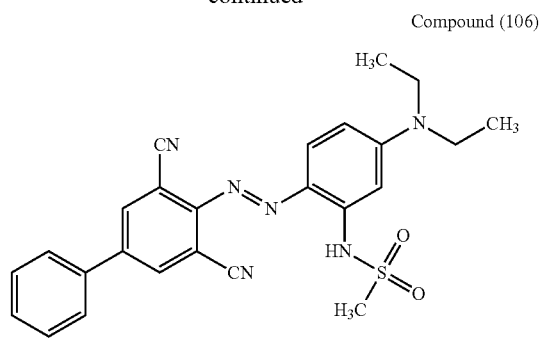

Compound (107)
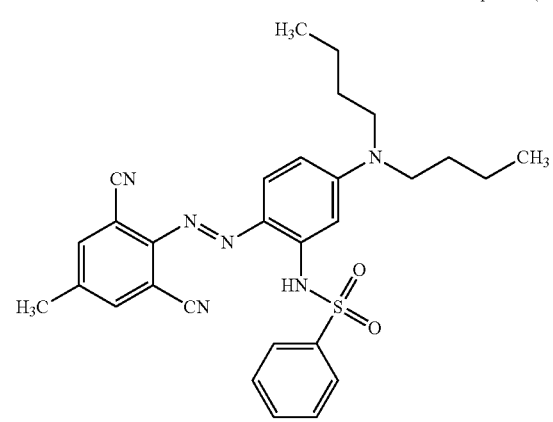

Compound (108)
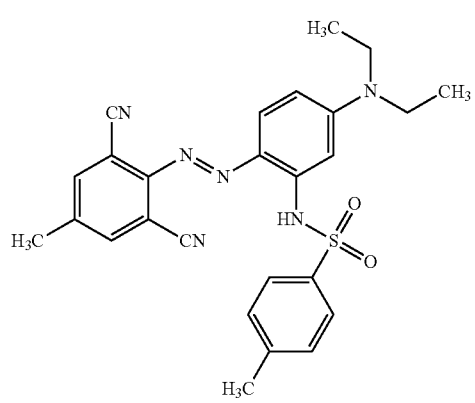

Among these compounds, the compounds (100), (102), (103), and (104) are preferably included in the magenta dye. The compound (102) is more preferably included in the magenta dye in order to achieve a high chroma, a wide-color-gamut reproduction capability, and high-quality process black.

Yellow Dye

The yellow dye represented by General Formula (10) is described below.

General Formula (10)

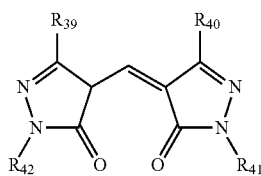

[In General Formula (10), $R_{39}$ to $R_{42}$ each independently represent an alkyl group, an aryl group having no substituents, or an aryl group having a substituent.]

When one or more of $R_{39}$ to $R_{42}$ in General Formula (10) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When one or more of $R_{39}$ to $R_{42}$ in General Formula (10) represent an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group or an alkoxy group.

Preferred examples of the compound represented by General Formula (10) include, but are not limited to, the compounds (109) to (118) below.

Compound (109)

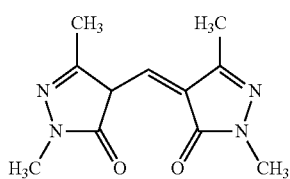

Compound (110)

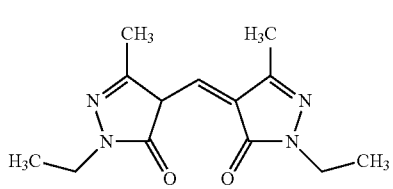

Compound (111)

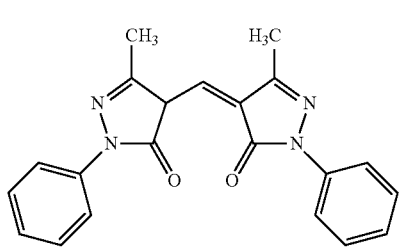

Compound (112)

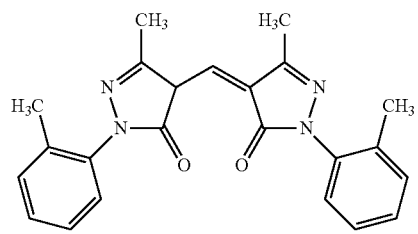

Compound (113)

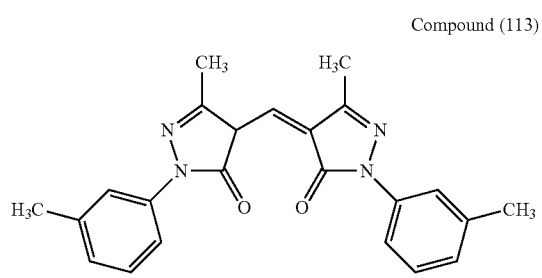

Compound (114)

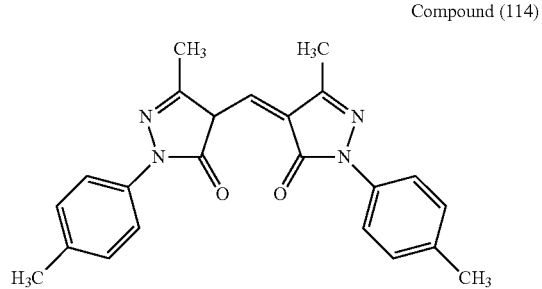

Compound (115)

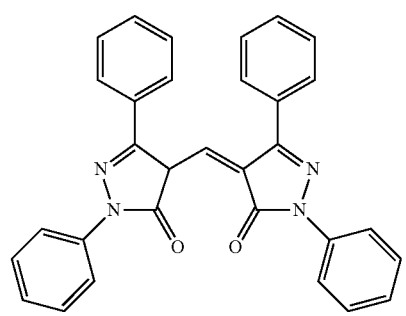

Compound (116)

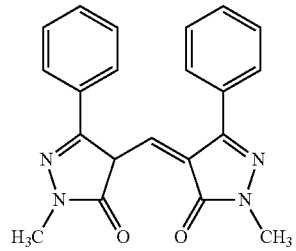

-continued

Compound (117)

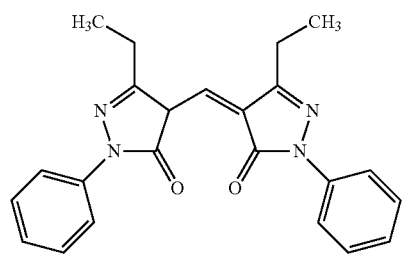

Compound (118)

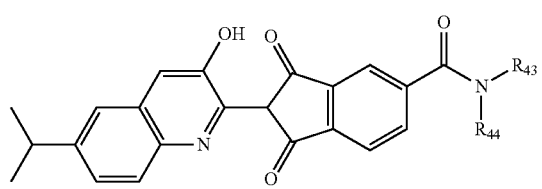

Among these compounds, the compounds (111), (112), (113), and (114) are preferably included in the yellow dye. The compound (111) is more preferably included in the yellow dye in order to achieve a high chroma, a wide-color-gamut reproduction capability, and high-quality process black.

The yellow dye represented by General Formula (11) is described below.

General Formula (11)

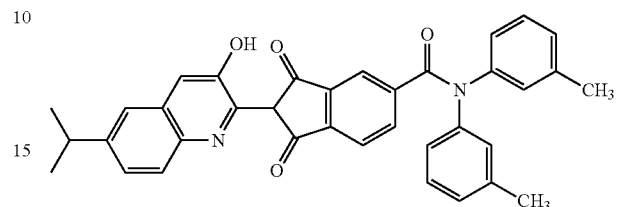

[In General Formula (11), $R_{43}$ and $R_{44}$ each independently represent an alkyl group, an aryl group having no substituents, or an aryl group having a substituent.]

When at least one of $R_{43}$ and $R_{44}$ in General Formula (11) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When at least one of $R_{43}$ and $R_{44}$ in General Formula (11) represents an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black. The aryl group may have a substituent such as an alkyl group.

Preferred examples of the compound represented by General Formula (11) include, but are not limited to, the compounds (119) to (127) below.

Compound (119)

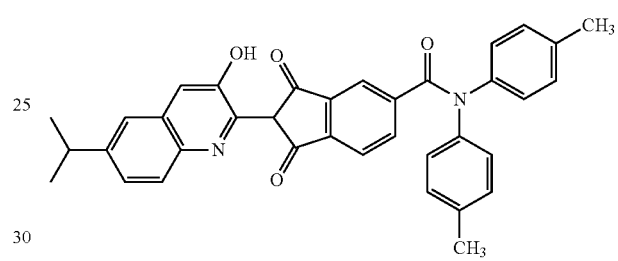

Compound (120)

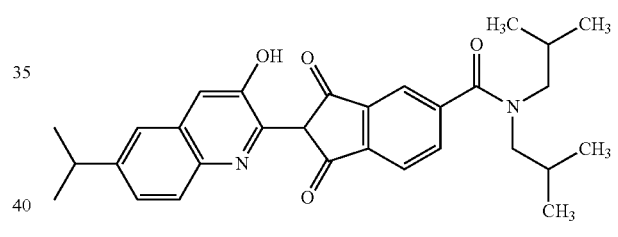

Compound (121)

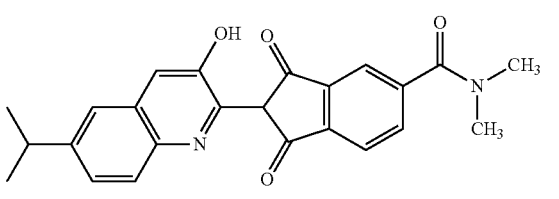

Compound (122)

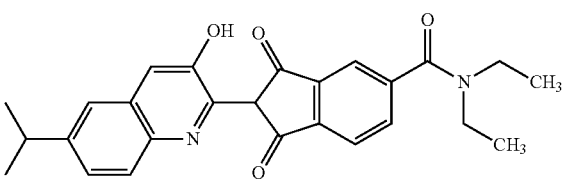

Compound (123)

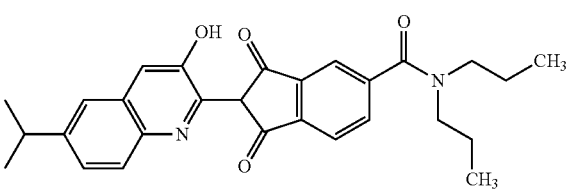

Compound (124)

Compound (125)

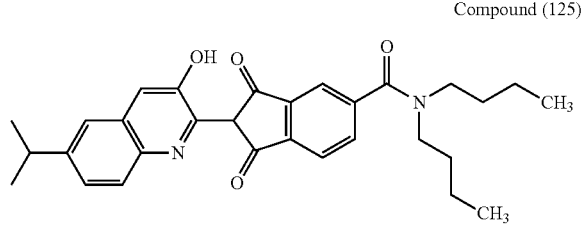

Compound (126)

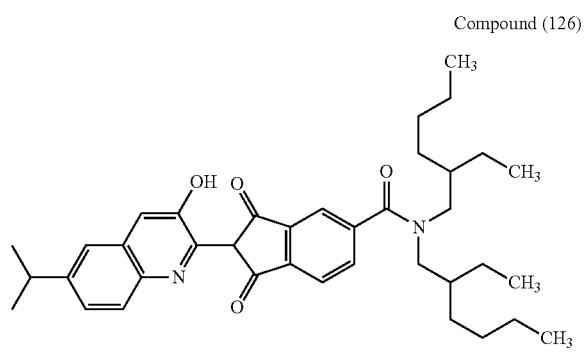

Compound (127)

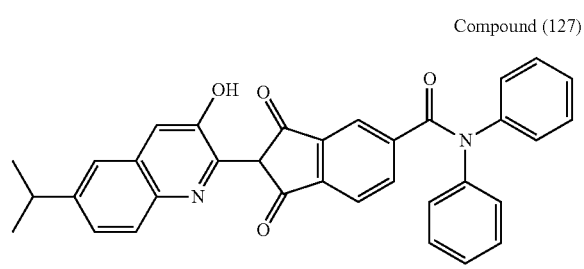

Among these compounds, the compounds (124), (125), and (126) are preferably included in the yellow dye. The compound (125) is more preferably included in the yellow dye in order to achieve a high chroma, a wide-color-gamut reproduction capability, and high-quality process black.

The yellow dye represented by General Formula (12) is described below.

General Formula (12)

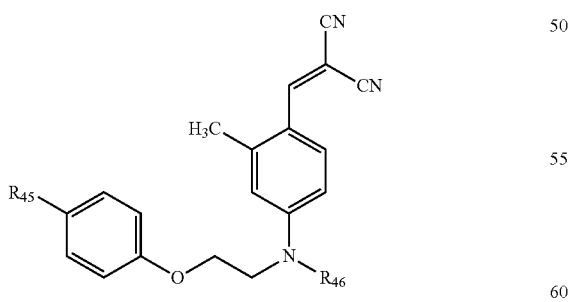

[In General Formula (12), $R_{45}$ and $R_{46}$ each independently represent an alkyl group, an aryl group having no substituents, or an aryl group having a substituent.]

When at least one of $R_{45}$ and $R_{46}$ in General Formula (12) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl, and a 2-ethylhexyl group. In particular, an alkyl group having 1 or 2 carbon atoms, such as a methyl group or an ethyl group, is preferably used in order to achieve a high chroma, a wide-color-gamut reproduction capability, and high-quality process black.

When at least one of $R_{45}$ and $R_{46}$ in General Formula (12) represents an aryl group, examples of the aryl group include, but are not particularly limited to, a phenyl group and a naphthyl group. In particular, a phenyl group is preferably used in order to achieve a high chroma, a wide-color-gamut reproduction capability, and high-quality process black.

Preferred examples of the compound represented by General Formula (12) include, but are not limited to, the compounds (128) to (132) below.

Compound (128)

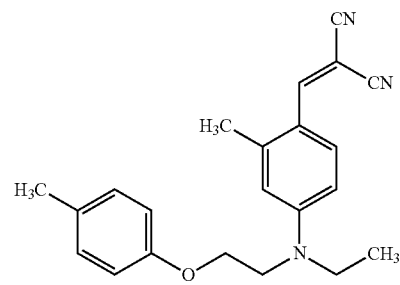

Compound (129)

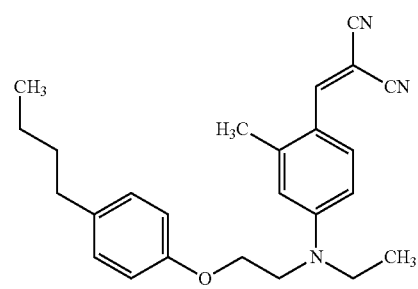

Compound (130)

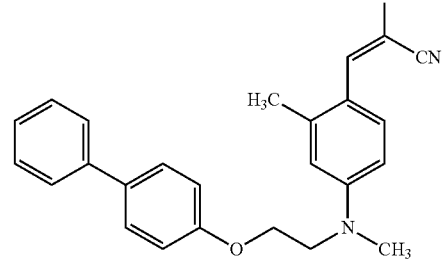

-continued

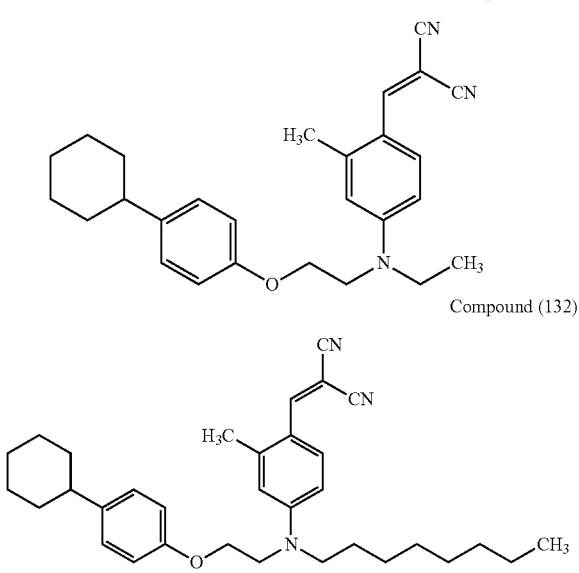

Compound (131)

Compound (132)

Among these compounds, the compounds (131) and (132) are preferably included in the yellow dye. The compound (131) is more preferably included in the yellow dye in order to achieve a high chroma, a wide-color-gamut reproduction capability, and high-quality process black.

Thermal Transfer Recording Sheet

The thermal transfer recording sheet according to the present invention is a thermal transfer sheet including a base material and a colorant layer disposed on the base material. The colorant layer is constituted by at least a yellow dye layer including a yellow dye, a magenta dye layer including a magenta dye, and a cyan dye layer including a cyan dye.

Images can be formed using the thermal transfer recording sheet in the following manner. The thermal transfer recording sheet is superimposed on an image-receiving sheet including a colorant-receiving layer disposed thereon. The colorant included in the thermal transfer recording sheet is sublimated by heating the thermal transfer recording sheet using heating means such as a thermal head and thereby transferred to the image-receiving sheet.

The structure of the thermal transfer recording sheet according to the present invention is described below.

Base Material

The base material constituting the thermal transfer sheet according to the present invention supports the colorant layer described below. Any publicly known base material may be used. Examples of the base material include a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, cellophane, a cellulose derivative, a polyethylene film, a polyvinyl chloride film, a nylon film, condenser paper, and paraffin paper. However, examples of the base material are not limited, and any publicly known base material having certain heat resistance and a certain strength may be used.

In particular, the base material is further preferably a polyethylene terephthalate film from the viewpoints of mechanical strength, resistance to solvents, and economy.

The thickness of the base material is 0.5 to 50 µm and is preferably 3 to 10 µm from the viewpoint of transferability.

It is preferable that one or both sides of the base material are subjected to an adhesive treatment as needed. In general, the adhesive treatment is preferably performed because, when the base material is coated with a dye ink in order to form a colorant layer, the wettability, adhesion, and the like of the coating liquid are likely to be insufficient.

Examples of the adhesive treatment include, but are not particularly limited to, an ozone treatment, a corona discharge treatment, an ultraviolet treatment, a plasma treatment, a low-temperature plasma treatment, a primer treatment, and a chemical treatment. These treatments may be performed in combination of two or more.

In the adhesive treatment of the base material, an adhesive layer may be deposited on the base material by coating.

Examples of a material of the adhesive layer include, but are not particularly limited to, organic materials such as a polyester resin, a polystyrene resin, a polyacrylic ester resin, a polyamide resin, a polyether resin, a polyvinyl acetate resin, a polyethylene resin, a polypropylene resin, a polyvinyl chloride resin, a polyvinyl alcohol resin, and a polyvinyl butyral resin and inorganic fine particles such as silica particles, alumina particles, magnesium carbonate particles, magnesium oxide particles, and titanium oxide particles.

Colorant Layer

The thermal transfer recording sheet according to the present invention includes a base material and colorant layers disposed on the base material. The colorant layer includes at least a yellow dye layer, a magenta dye layer, and a cyan dye layer. The thermal transfer recording sheet may include a publicly known black dye layer as an additional dye layer.

Although a method for forming the dye layers on the base material is not particularly limited, the dye layers are each formed on the base material by a frame sequential method in the thermal transfer recording sheet according to the present invention. For example, the yellow dye layer, the magenta dye layer, and the cyan dye layer may be formed repeatedly on the base sheet in the direction in which the base sheet is transported. In the case where such a thermal transfer recording sheet is used, a yellow image, a magenta image, and a cyan image are sequentially formed in order to form one full-color image, and the sequence of images is formed repeatedly. In addition to the plurality of dye layers, a transferable protection layer may optionally be formed by a frame sequential method. Alternatively, a thermal melting black layer may be added.

The magenta dye included in the magenta dye layer is a compound represented by General Formula (1). The yellow dye included in the yellow dye layer is a compound represented by General Formula (2). The cyan dye included in the cyan dye layer is at least one compound selected from the group consisting of compounds represented by General Formulae (3) to (5).

One of the most distinctive features of the present invention is using the magenta dye represented by General Formula (1) and the yellow dye represented by General Formula (2) in combination. Using these dyes in combination widens the range of color gamut that can be achieved.

Compounds represented by General Formulae (6) to (9) may also be used in combination as magenta dye included in the magenta dye layer. Compounds represented by General Formulae (10) to (13) may also be used in combination as yellow dye included in the yellow dye layer.

When compounds represented by General Formulae (6) to (9) are used in combination as magenta dye and compounds represented by General Formulae (10) to (12) are used in combination as yellow dye, further high-quality process black may be produced.

Publicly known dyes that are used for thermal transferring in the related art and that undergo sublimation migration when being heated may also be used in combination with the above-described dyes. The types of such dyes are not particularly limited and selected appropriately in consideration of hue, print sensitivity, lightfastness, preservability, binder solubility, and the like.

Although a method for forming the dye layers is not particularly limited, in general, dye layers including the respective dye coloring matters and a binder resin are formed in the following manner.

The specific dyes described above, a binder resin, and, as needed, a surfactant and wax are gradually added to a medium under stirring so as to be uniformly mixed with the medium. These compositions are subjected to a mechanical sharing force using a dispersing machine so as to be stably dissolved or dispersed in the form of fine particles. Thus, an ink is prepared. The ink is applied to a base film, which serves as a base material. The deposited ink is dried to prepare a dye layer on the base material. From the viewpoint of transferability, the amount of ink deposited on the base film is preferably controlled so that the thickness of the colorant layer is 0.1 to 5 μm after being dried.

Examples of the medium that can be used in the above-described production method include, but are not particularly limited to, water and organic solvents. Examples of the organic solvents include alcohols such as methanol, ethanol, isopropanol, and isobutanol; cellosolves such as methyl cellosolve and ethyl cellosolve; aromatic hydrocarbons such as toluene, xylene, and chlorobenzene; esters such as ethyl acetate and butyl acetate; ketones such as acetone, methyl ethyl ketone, methyl isobutyl ketone, and cyclohexanone; halogenated hydrocarbons such as methylene chloride, chloroform, and trichloroethylene; ethers such as tetrahydrofuran and dioxane; N,N-dimethylformamide; and N-methylpyrrolidone. These organic solvents may be used alone or, as needed, in combination of two or more.

For each color, the amount of dye used in the present invention is 50 to 300 parts by mass, is preferably 80 to 280 parts by mass, and is further preferably 85 to 250 parts by mass relative to 100 parts by mass of the binder resin from the viewpoint of transferability. In the case where two or more dyes are used in a mixture, the expression "the amount of dye used" translates into the total amount of the dye coloring matters used.

Various resins may be used as a binder resin in the present invention. In particular, water soluble resins such as a cellulose resin, a polyacrylic acid resin, a starch resin, and an epoxy resin; and organic-solvent soluble resins such as a polyacrylate resin, a polymethacrylate resin, a polystyrene resin, a polycarbonate resin, a polyethersulfone resin, a polyvinyl butyral resin, an ethylcellulose resin, an acetylcellulose resin, a polyester resin, an AS resin, and a phenoxy resin are preferably used. These resins may be used alone or, as needed, in combination of two or more.

Other Constituents

The thermal transfer recording sheet according to the present invention may include a surfactant in order to increase lubricity in a condition where the thermal head is heated (i.e., during printing). Examples of the surfactant that can be added include a cationic surfactant, an anionic surfactant, and a nonionic surfactant.

Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include fatty acid soaps such as sodium stearate and sodium dodecanoate, sodium dodecyl sulfate, sodium dodecylbenzene sulfate, and sodium lauryl sulfate.

Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

The thermal transfer recording sheet according to the present invention may include wax in order to increase lubricity in a condition where the thermal head is not heated. Examples of the wax that can be added include, but are not particularly limited to, a polyethylene wax, a paraffin wax, and a fatty acid ester wax.

In addition to the above-described additives, optionally, an ultraviolet absorber, a preservative, an antioxidant, an antistatic agent, and a viscosity modifier may be added to the thermal transfer sheet according to the present invention.

In order to enhance heat resistance and the mobility of the thermal head, the thermal transfer recording sheet according to the present invention preferably includes a heat-resistant lubricity layer disposed on a side of the base material which is opposite to a side on which the colorant layer is disposed. The heat-resistant lubricity layer is composed of a heat-resistant resin. Examples of the heat-resistant resin include, but are not particularly limited to, a polyvinyl butyral resin, a polyvinyl acetal resin, a polyester resin, a polyether resin, a polybutadiene resin, a vinyl chloride-vinyl acetate copolymer resin, a styrene-butadiene copolymer resin, polyurethane acrylate, polyester acrylate, a polyimide resin, and a polycarbonate resin.

The heat-resistant lubricity layer may further include a lubricant, a cross-linking agent, a parting agent, and the like.

Examples of the lubricant include, but are not particularly limited to, an amino-modified silicone compound and a carboxy-modified silicone compound. Examples of a heat-resistant fine particles include, but are not particularly limited to, silica fine particles. Examples of a binding agent include, but are not particularly limited to, acrylic resins.

The heat-resistant lubricity layer is formed by coating the base material with a heat-resistant lubricity layer coating liquid, which is prepared by dissolving or dispersing the above-described resins and additives in a solvent. The heat-resistant lubricity layer coating liquid can be applied to the base material by using, for example, a bar coater, a gravure coater, a reverse roll coater, a rod coater, an air doctor coater. However, the coating method is not limited. In particular, a gravure coater is preferably used. From the viewpoint of transferability, the amount of heat-resistant lubricity layer coating liquid deposited is preferably controlled so that the thickness of the colorant layer is 0.1 to 5 μm after being dried.

The deposited heat-resistant lubricity layer coating liquid is preferably dried at 50° C. to 120° C. for about 1 second to about 5 minutes. However, the drying temperature and the drying time are not limited. If the deposited heat-resistant lubricity layer coating liquid is not sufficiently dried, scumming may occur. Furthermore, the dye ink may cause set-off when the thermal transfer recording sheet is wound, which results in occurrence of kickback, which is a phenomenon in which the transferred dye ink is again transferred to another dye layer having a different hue when the thermal transfer recording sheet is rewound.

Heating Means

Heating means for heating the thermal transfer recording sheet according to the present invention is not particularly limited. As well as a thermal head used in the conventional method, infrared rays and a laser beam may also be used. The thermal transfer recording sheet may be heated by directly feeding current through the base film. In such a case, an electric dye-transfer sheet including an electric heat-generating film may be produced.

EXAMPLES

The present invention is further described in detail with reference to Examples and Comparative Examples below, but not limited to these examples. Hereinafter, "parts" and "%" are on a mass basis unless otherwise specified. Identification of the compounds prepared was performed using an $^1$H nuclear magnetic resonance spectrometric analysis ($^1$H-NMR) system (ECA-400, produced by JEOL Ltd.) and an LC/TOF MS (LC/MSD TOF, produced by Agilent Technologies) system.

Preparation of Coloring Matter Compound Having Structure Represented by General Formula (1)

A coloring matter compound having the structure represented by General Formula (1) according to the present invention can be synthesized by a publicly known method.

The compound represented by General Formula (1) according to the present invention was prepared by the method described below.

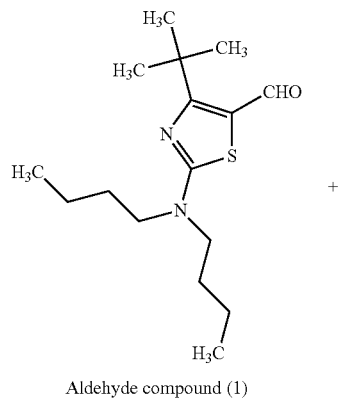

Aldehyde compound (1)

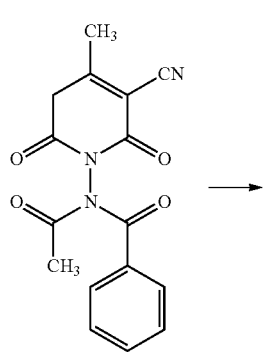

Pyridone compound (1)

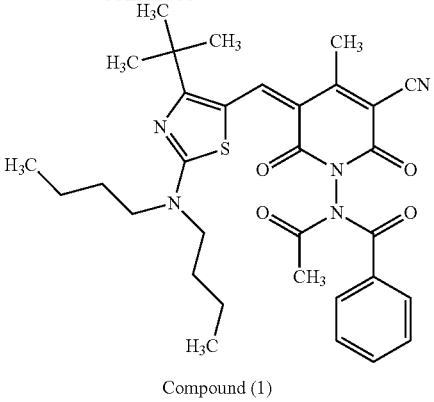

Compound (1)

Production Example 1

Preparation of Compound (1)

To a suspension of 10 mmol of a pyridone compound (1) in 20 mL of toluene, 100 mg of p-toluenesulfonic acid was added. Then, the temperature was increased to 70° C. A solution of 10 mmol of an aldehyde compound (1) in 20 mL of toluene was added dropwise to the resulting mixture. The mixture was heated under reflux at 160° C. for 6 hours while performing azeotropic dehydration. After the reaction was completed, the temperature was reduced to room temperature. The mixture was diluted with isopropanol. The mixture was concentrated under reduced pressure, and the residue was purified by column chromatography (eluent: ethyl acetate/heptane). Thus, 4.6 g (yield: 78%) of a compound (1) was prepared. The $^1$H-NMR spectrum of the compound (1) which was measured in CDCl$_3$ at room temperature at 400 MHz is shown below.

Results of Analysis of Compound (1)

[1] $^1$H-NMR (400 MHz, CDCl$_3$, room temperature): δ (ppm)=0.97 (3H, t, J=7.33 Hz), 1.03 (3H, t, J=7.33 Hz), 1.36 (2H, dd, J=7.33, 14.7 Hz), 1.43-1.58 (11H, m), 1.66-1.78 (4H, m), 2.48 (3H, s), 2.56 (3H, s), 3.50 (2H, t, J=7.56 Hz), 3.80 (2H, t, J=7.33 Hz), 7.34 (2H, t, J=7.56 Hz), 7.45 (1H, t, J=6.87 Hz), 7.68 (2H, d, J=8.24 Hz), 8.24 (1H, s)

[2] Mass analysis (ESI-TOF): m/z=590.2989 (M+H)$^+$

The other compounds shown in Tables 1 to 3 were prepared as in Production Example 1, or commercially available products were used instead.

In Table 1, the symbols "Y", "M", and "C" represent "yellow", "magenta", and "cyan", respectively.

Preparation of Thermal Transfer Recording Sheet

Magenta Ink Preparation Example 1

To a mixed solution of 45 parts of methyl ethyl ketone and 45 parts of toluene, 5 parts of a polyvinyl butyral resin (DENKA 3000-K, produced by SEKISUI CHEMICAL CO., LTD.) was gradually added and dissolved. In the resulting mixture, 5 parts of the compound (1) was completely dissolved. Thus, a magenta ink (M1), which constituted a thermal transfer recording sheet, was prepared.

Magenta Ink Preparation Examples 2 to 12

Magenta inks (M2) to (M12) were each prepared using the specific magenta dyes at the specific mixing ratio shown in Table 1 so that the total amount of the magenta dyes was 5 parts.

TABLE 1

| Combination | M dye General Formula 1 | M dye General Formula 6 | M dye General Formula 7 | M dye General Formula 8 | M dye General Formula 9 | Mixing ratio |
|---|---|---|---|---|---|---|
| M1 | Compound (1) | | | | | 1:0:0:0:0 |
| M2 | Compound (1) | Compound (73) | Compound (89) | | | 2:1:1:0:0 |
| M3 | Compound (6) | Compound (75) | Compound (84) | Compound (94) | | 3:1:1:1:0 |
| M4 | Compound (28) | Compound (76) | Compound (85) | | | 3:2:1:0:0 |
| M5 | Compound (3) | Compound (74) | Compound (86) | Compound (95) | | 4:1:1:2:0 |
| M6 | Compound (10) | | Compound (88) | | Compound (102) | 2:0:1:0:1 |
| M7 | Compound (13) | Compound (77) | | | Compound (103) | 3:2:0:0:1 |
| M8 | Compound (1) | Compound (76) | Compound (85) | | | 3:2:1:0:0 |
| M9 | Compound (6) | Compound (75) | Compound (84) | Compound (94) | | 3:1:1:1:0 |
| M10 | | Compound (73) | Compound (89) | | | 0:1:1:0:0 |
| M11 | Compound (13) | Compound (73) | | | | 4:1:0:0:0 |
| M12 | Compound (13) | | | | Compound (102) | 4:0:0:0:1 |

Yellow Ink Preparation Examples 1 to 15

Yellow inks (Y1) to (Y15) were each prepared using the specific yellow dyes at the specific mixing ratio shown in Table 2 so that the total amount of the yellow dyes was 5 parts.

TABLE 2

| Combination | Y dye General Formula 2 | Y dye General Formula 10 | Y dye General Formula 11 | Y dye General Formula 12 | Other compound | Mixing ratio |
|---|---|---|---|---|---|---|
| Y1 | Compound (45) | | | | | 1:0:0:0:0 |
| Y2 | Compound (50) | | Compound (125) | Compound (131) | | 2:0:1:1:0 |
| Y3 | Compound (51) | | Compound (125) | Compound (132) | | 2:0:1:1:0 |
| Y4 | Compound (45) | Compound (113) | Compound (124) | | | 2:1:1:0:0 |
| Y5 | Compound (44) | Compound (112) | | Compound (132) | | 2:1:0:1:0 |
| Y6 | Compound (50) | Compound (111) | Compound (126) | | | 3:2:1:0:0 |
| Y7 | Compound (51) | Compound (114) | | Compound (131) | | 2:1:0:1:0 |
| Y8 | | Compound (113) | Compound (124) | | | 0:1:1:0:0 |
| Y9 | | | Compound (125) | Compound (132) | | 0:0:1:1:0 |
| Y10 | | Compound (113) | Compound (125) | Compound (131) | | 0:2:1:1:0 |
| Y11 | | | Compound (125) | Compound (131) | | 0:0:1:1:0 |
| Y12 | | | | Compound (131) | Compound (135) | 0:0:0:1:1 |
| Y13 | | | | Compound (131) | Compound (136) | 0:0:0:1:1 |
| Y14 | Compound (133) | | | | Compound (136) | 1:0:0:0:1 |
| Y15 | Compound (134) | | | | Compound (136) | 1:0:0:0:1 |

Cyan Ink Preparation Examples 1 to 7

Cyan inks (C1) to (C7) were each prepared using the specific cyan dyes at the specific mixing ratio shown in Table 3 so that the total amount of the cyan dyes was 5 parts.

TABLE 3

| Combination | C dye General Formula 3 | C dye General Formula 4 | C dye General Formula 5 | Mixing ratio |
|---|---|---|---|---|
| C1 | Compound (55) | Compound (64) | Compound (67) | 1:1:1 |
| C2 | Compound (56) | Compound (63) | Compound (68) | 1:2:1 |
| C3 | Compound (55) |  | Compound (67) | 1:0:1 |
| C4 | Compound (55) | Compound (63) |  | 1:1:0 |
| C5 | Compound (54) | Compound (62) |  | 1:1:0 |
| C6 | Compound (55) | Compound (64) | Compound (72) | 2:1:1 |
| C7 | Compound (54) | Compound (63) |  | 2:1:0 |

Using the resulting thermal transfer recording sheet including the magenta dye layer, the yellow dye layer, and the cyan dye layer, an image was transferred to a printing paper with Selphy CP900 produced by CANON KABUSHIKI KAISHA. Thus, an image sample (1) was formed.

M, Y, and C images were each printed while the printing output was changed from 0% to 100% in intervals of 10% and merged into a single image, which was output as an image sample.

Examples 2 to 11 and Comparative Examples 1 to 4

Thermal transfer recording sheets including the magenta dye layer, yellow dye layer, and cyan dye layer were prepared as in Example 1, except that the magenta ink, yellow ink, and cyan ink used were changed as shown in Table 4.

Image samples (2) to (11) and comparative image samples (1) to (4) were formed using the respective thermal transfer recording sheets.

TABLE 4

| Compound | M dye Combination | Y dye Combination | C dye Combination | Color gamut area | Process black | Printing density | Overall rating |
|---|---|---|---|---|---|---|---|
| Example 1 | M1 | Y1 | C1 | 129 (A) | 0.43 (B) | 6.11 (A) | A |
| Example 2 | M2 | Y2 | C2 | 117 (A) | 0.35 (A) | 6.02 (A) | A |
| Example 3 | M3 | Y3 | C3 | 119 (A) | 0.38 (A) | 5.87 (B) | A |
| Example 4 | M4 | Y4 | C4 | 110 (B) | 0.41 (B) | 5.94 (A) | B |
| Example 5 | M5 | Y5 | C5 | 112 (B) | 0.34 (A) | 5.77 (B) | B |
| Example 6 | M6 | Y6 | C6 | 116 (A) | 0.38 (A) | 6.01 (A) | A |
| Example 7 | M7 | Y7 | C7 | 117 (A) | 0.33 (A) | 5.81 (A) | A |
| Example 8 | M11 | Y12 | C4 | 114 (B) | 0.36 (A) | 5.98 (A) | A |
| Example 9 | M12 | Y13 | C4 | 116 (A) | 0.32 (A) | 6.01 (A) | A |
| Example 10 | M11 | Y14 | C4 | 119 (A) | 0.32 (A) | 6.12 (A) | A |
| Example 11 | M12 | Y15 | C4 | 117 (A) | 0.34 (A) | 6.09 (A) | A |
| Comparative example 1 | M8 | Y8 | C4 | 103 (C) | 0.73 (C) | 5.56 (C) | C |
| Comparative example 2 | M9 | Y9 | C3 | 105 (C) | 0.71 (C) | 5.66 (C) | C |
| Comparative example 3 | M10 | Y10 | C2 | 104 (C) | 0.57 (B) | 5.57 (C) | C |
| Comparative example 4 | M10 | Y11 | C2 | 100 (C) | 0.65 (B) | 5.31 (D) | C |

Example 1

A polyethylene terephthalate film (Lumirror, produced by Toray Industries, Inc.) having a thickness of 4.5 μm was used as a base material. The base material was coated with the magenta ink (1), which constituted a thermal transfer recording sheet, so that the thickness of the coating film was 1 μm after being dried. The coating film was dried to form a magenta dye layer. A thermal transfer recording sheet (M1) having Subsequently, a yellow dye layer was formed in a region adjacent to the magenta dye layer as in the formation of the magenta dye layer, except that the yellow ink (1) was used instead of the magenta ink (1). In the same manner, a cyan dye layer was formed using the cyan ink (1) in a region adjacent to the yellow dye layer.

Evaluations

Evaluation of Color Gamut Volume

Chromaticities (L*, a*, b*) of primary-color portions and secondary-color portions of each image sample based on the L*a*b* color coordinate system were measured using a spectrodensitometer "SpectroLino" (produced by Gretag-Macbeth GmbH).

The color reproduction area was simulated using the measurement results to evaluate by how many percent the color reproduction volume was increased relative to those measured in a comparative example. The comparative example used as a reference was Comparative Example 4, in which high-chroma magenta and yellow dyes were not used.

Evaluation of color gamut volume was made in accordance with the following criteria. Table 4 summarizes the results.

A: 115≤% Color gamut volume
B: 105≤% Color gamut volume<115%
C: Color gamut volume<105%

Evaluation of Process Black

The reflectance spectrum of a process-black portion of each image sample was measured using a spectrodensitometer "SpectroLino" (produced by GretagMacbeth GmbH).

The average reflectance was calculated on the basis of the reflectance spectrum. Evaluation was made on the assumption that the lower the average reflectance, the higher the process-black reproduction capability.

The criteria used for evaluating process black were as follows. Table 4 summarizes the results.

A: (Average reflectance×100)<0.4
B: 0.4≤(Average reflectance×100)<0.6
C: 0.6≤(Average reflectance×100)

Evaluation of Printing Density

The spectral reflectance densities at the magenta 100%-print portion, the yellow 100%-print portion, and the cyan 100%-print portion of each image sample were measured using a spectrodensitometer "SpectroLino" (produced by GretagMacbeth GmbH).

Evaluation of printing density was made on the basis of the total of the spectral reflectance densities for magenta, yellow, and cyan.

The criteria used for evaluating printing density were as follows. Table 4 summarizes the results.

A: 5.9≤Printing density
B: 5.7≤Printing density<5.9
C: Printing density<5.7

Overall Rating

Table 4 summarizes the overall ratings based on the results of evaluations of color gamut area, process black, and printing density.

As is clear from the overall ratings, the thermal transfer recording sheet according to the present invention enables high-chroma images to be formed, has a high color-developability that enables a wide color gamut to be achieved, and enables high-quality black images to be formed using process black.

According to the present invention, a thermal transfer recording sheet that enables high-chroma images to be formed, a wide color gamut to be achieved, and high-quality (small average spectral reflectance) black images to be formed using process black may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

By using the thermal transfer recording sheet according to the present invention, an image sample having high chroma and a wide-color-gamut reproduction capability, in which high-quality black images are formed using process black, may be formed.

The invention claimed is:

1. A thermal transfer recording sheet comprising a base material and a colorant layer on the base material,
wherein the colorant layer includes a yellow dye layer comprising a yellow dye, a magenta dye layer comprising a magenta dye, and a cyan dye layer comprising a cyan dye, the magenta dye containing a compound represented by General Formula (1), the yellow dye containing a compound represented by General Formula (2), and the cyan dye containing at least one compound selected from the group consisting of compounds represented by General Formulae (3) to (5),

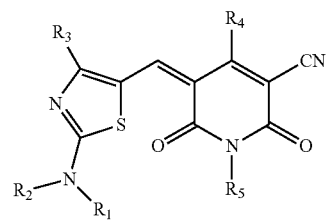

General Formula (1)

wherein, in General Formula (1), $R_1$ and $R_2$ each independently represent an alkyl group;

$R_3$ represents a hydrogen atom, an alkyl group, an aryl group having no substituents, or an aryl group having a substituent;

$R_4$ represents an alkyl group, an aryl group having no substituents, or an aryl group having a substituent; and $R_5$ represents a hydrogen atom, an alkyl group, an aryl group having no substituents, an aryl group having a substituent, or —N(—$R_6$)$R_7$, $R_6$ and $R_7$ each independently represent a hydrogen atom, an alkyl group, or an acyl group, and $R_6$ and $R_7$ may be bonded to each other to form a ring,

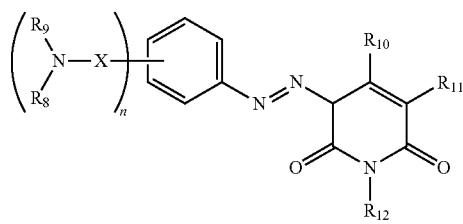

General Formula (2)

wherein, in General Formula (2), $R_8$ represents an alkyl group;

$R_9$ represents a hydrogen atom or an alkyl group;

$R_{10}$ represents an alkyl group, an aryl group having no substituents, an aryl group having a substituent, or an amino group;

$R_{11}$ represents a hydrogen atom, a cyano group, a carbamoyl group, a carboxylic acid ester group, or a carboxylic acid amide group;

$R_{12}$ represents a hydrogen atom, an alkyl group, an aryl group having no substituents, an aryl group having a substituent, or —N(—$R_{13}$)$R_{14}$, $R_{13}$ and $R_{14}$ each independently represent a hydrogen atom, an alkyl group, or an acyl group, and $R_{13}$ and $R_{14}$ may be bonded to each other to form a ring;

X represents a carbonyl group or a sulfonyl group; and n is an integer of 1 to 3,

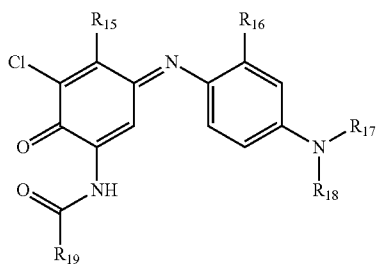

General Formula (3)

wherein, in General Formula (3), $R_{15}$ to $R_{19}$ each independently represent an alkyl group, an aryl group having no substituents, or an aryl group having a substituent,

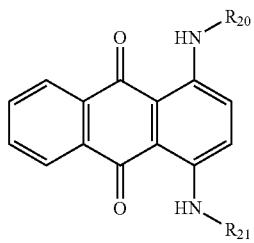

General Formula (4)

wherein, in General Formula (4), $R_{20}$ and $R_{21}$ each independently represent an alkyl group, an aryl group having no substituents, or an aryl group having a substituent, and

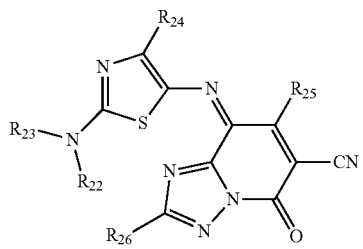

General Formula (5)

wherein, in General Formula (5), $R_{22}$ to $R_{26}$ each independently represent an alkyl group, an aryl group having no substituents, or an aryl group having a substituent.

2. The thermal transfer recording sheet according to claim 1, wherein $R_3$ in General Formula (1) is an alkyl group.

3. The thermal transfer recording sheet according to claim 1, wherein $R_3$ in General Formula (1) is a tert-butyl group.

4. The thermal transfer recording sheet according to claim 1, wherein any one of $R_6$ and $R_7$ in General Formula (1) is an alkyl group.

5. The thermal transfer recording sheet according to claim 1, wherein the magenta dye contains, in addition to the compound represented by General Formula (1), at least one compound selected from the group consisting of compounds represented by General Formulae (6) to (9),

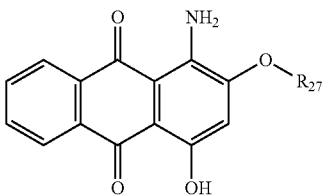

General Formula (6)

wherein, in General Formula (6), $R_{27}$ represents an alkyl group, an aryl group having no substituents, an aryl group having a substituent, or $-(R_{47}-O)n-R_{48}$, $R_{47}$ represents an alkylene, and $R_{48}$ represents an alkyl group,

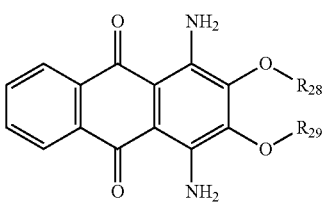

General Formula (7)

wherein, in General Formula (7), $R_{28}$ and $R_{29}$ each independently represent an alkyl group, an aryl group having no substituents, or an aryl group having a substituent,

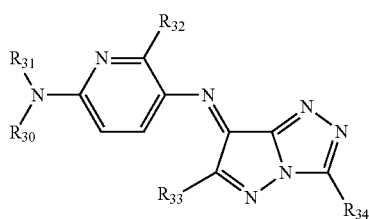

General Formula (8)

wherein, in General Formula (8), $R_{30}$ to $R_{34}$ each independently represent an alkyl group, an aryl group having no substituents, or an aryl group having a substituent, and

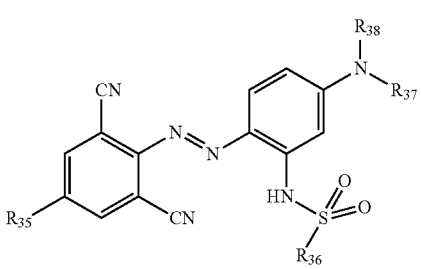

General Formula (9)

wherein, in General Formula (9), $R_{35}$ to $R_{38}$ each independently represent an alkyl group, an aryl group having no substituents, or an aryl group having a substituent.

6. The thermal transfer recording sheet according to claim 1, wherein the yellow dye contains, in addition to the compound represented by General Formula (2), at least one compound selected from the group consisting of compounds represented by General Formulae (10) to (12),

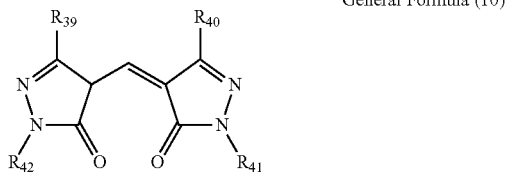

General Formula (10)

wherein, in General Formula (10), $R_{39}$ and $R_{42}$ each independently represent an alkyl group, an aryl group having no substituents, or an aryl group having a substituent,

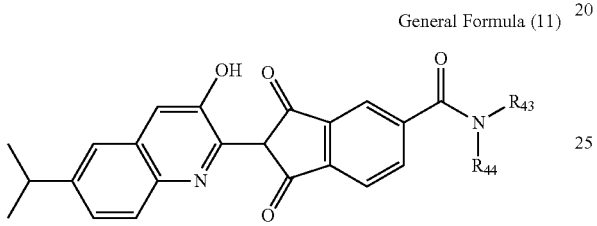

General Formula (11)

wherein, in General Formula (11), $R_{43}$ and $R_{44}$ each independently represent an alkyl group, an aryl group having no substituents, or an aryl group having a substituent, and

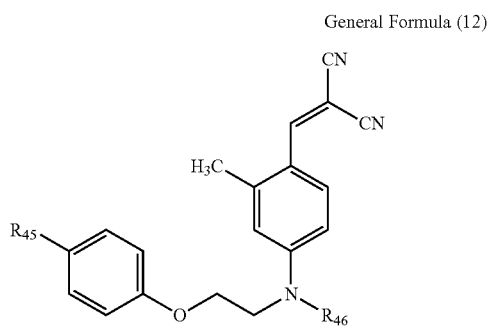

General Formula (12)

wherein, in General Formula (12), $R_{45}$ and $R_{46}$ each independently represent an alkyl group, an aryl group having no substituents, or an aryl group having a substituent.

7. The thermal transfer recording sheet according to claim 1, wherein the magenta dye further contains a compound represented by General Formula (6) or a compound represented by General Formula (9), and wherein the cyan dye further contains the compound represented by General Formula (3) or the compound represented by General Formula (4),

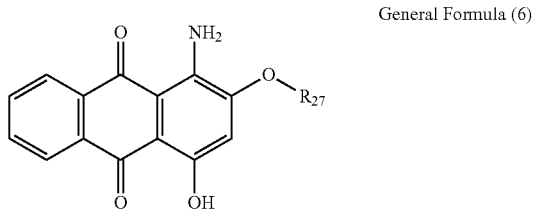

General Formula (6)

wherein, in General Formula (6), $R_{27}$ represents an alkyl group, an aryl group having no substituents, an aryl group having a substituent, or —($R_{47}$—O)n-$R_{48}$, $R_{47}$ represents an alkylene, and $R_{48}$ represents an alkyl group, and

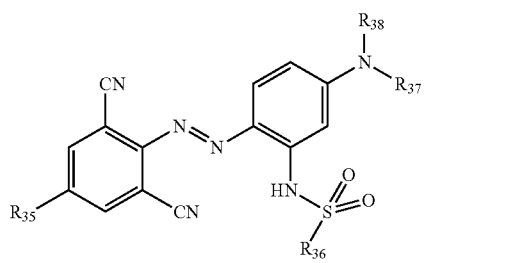

General Formula (9)

wherein, in General Formula (9), $R_{35}$ to $R_{38}$ each independently represent an alkyl group, an aryl group having no substituents, or an aryl group having a substituent.

* * * * *